US010970553B2

(12) United States Patent
Zhang et al.

(10) Patent No.: US 10,970,553 B2
(45) Date of Patent: Apr. 6, 2021

(54) SEMANTIC SEGMENTATION OF THREE-DIMENSIONAL DATA

(71) Applicant: UATC, LLC, San Francisco, CA (US)

(72) Inventors: Chris Jia-Han Zhang, Toronto (CA); Wenjie Luo, Toronto (CA); Raquel Urtasun, Toronto (CA)

(73) Assignee: UATC, LLC, San Francisco, CA (US)

( * ) Notice: Subject to any disclaimer, the term of this patent is extended or adjusted under 35 U.S.C. 154(b) by 265 days.

(21) Appl. No.: 16/123,233

(22) Filed: Sep. 6, 2018

(65) Prior Publication Data

US 2019/0147250 A1    May 16, 2019

Related U.S. Application Data

(60) Provisional application No. 62/586,777, filed on Nov. 15, 2017.

(51) Int. Cl.
| | |
|---|---|
| G06K 9/00 | (2006.01) |
| G06T 3/00 | (2006.01) |
| G01S 7/48 | (2006.01) |
| G01S 17/89 | (2020.01) |

(52) U.S. Cl.
CPC ........ *G06K 9/00718* (2013.01); *G01S 7/4808* (2013.01); *G06K 9/00791* (2013.01); *G06T 3/0031* (2013.01); *G01S 17/89* (2013.01)

(58) Field of Classification Search
None
See application file for complete search history.

(56) References Cited

U.S. PATENT DOCUMENTS

| | | | | |
|---|---|---|---|---|
| 6,400,831 | B2* | 6/2002 | Lee | G06T 7/11 |
| | | | | 348/169 |
| 9,734,455 | B2* | 8/2017 | Levinson | G01S 17/931 |
| 9,811,756 | B2* | 11/2017 | Liu | G06K 9/00791 |
| 10,203,210 | B1* | 2/2019 | Tagawa | G01C 21/32 |

(Continued)

OTHER PUBLICATIONS

I. Armeni, et al., "3D Semantic Parsing of Largescale Indoor Spaces", In Proceedings of the IEEE International Conference on Computer Vision and Pattern Recognition, 2016.

(Continued)

*Primary Examiner* — Anand P Bhatnagar
(74) *Attorney, Agent, or Firm* — Dority & Manning, P.A.

(57) ABSTRACT

Systems and methods for performing semantic segmentation of three-dimensional data are provided. In one example embodiment, a computing system can be configured to obtain sensor data including three-dimensional data associated with an environment. The three-dimensional data can include a plurality of points and can be associated with one or more times. The computing system can be configured to determine data indicative of a two-dimensional voxel representation associated with the environment based at least in part on the three-dimensional data. The computing system can be configured to determine a classification for each point of the plurality of points within the three-dimensional data based at least in part on the two-dimensional voxel representation associated with the environment and a machine-learned semantic segmentation model. The computing system can be configured to initiate one or more actions based at least in part on the per-point classifications.

24 Claims, 9 Drawing Sheets

(56) References Cited

U.S. PATENT DOCUMENTS

| | | | |
|---|---|---|---|
| 10,303,956 B2* | 5/2019 | Huang | G05D 1/0246 |
| 10,445,928 B2* | 10/2019 | Nehmadi | G01S 13/931 |
| 10,471,955 B2* | 11/2019 | Kouri | G08G 1/04 |
| 10,546,387 B2* | 1/2020 | Hirzer | G06T 7/11 |
| 10,678,244 B2* | 6/2020 | Iandola | G06K 9/00805 |
| 2012/0148162 A1* | 6/2012 | Zhang | G06T 7/11 382/195 |
| 2017/0124476 A1* | 5/2017 | Levinson | G01S 17/86 |
| 2018/0275658 A1* | 9/2018 | Iandola | G06F 30/20 |
| 2019/0051056 A1* | 2/2019 | Chiu | G06T 7/11 |
| 2019/0080467 A1* | 3/2019 | Hirzer | G06T 7/74 |
| 2019/0147220 A1* | 5/2019 | Mccormac | G06K 9/00201 382/103 |
| 2019/0188477 A1* | 6/2019 | Mair | G06T 7/70 |

OTHER PUBLICATIONS

V. Badrinarayanan, et al., "Segnet: A Deep Convolutional Encoder-Decoder Architecture for Image Segmentation", arXiv preprint arXiv:1511.00561, 2015.

L. C. Chen, et al., "Deeplab: Semantic Image Segmentation With Deep Convolutional Nets, Atrous Convolution, and Fully Connected CRFS", arXiv preprint arXiv:1606.00915, 2016.

X. Chen, et al., "Multi-view 3D Object Detection Network for Autonomous Driving", In IEEE CVPR, 2017.

O. Cicek, et al., "3D u-net: Learning Dense Volumetric Segmentation from Sparse Annotation", In International Conference on Medical Image Computing and Computer-Assisted Intervention, pp. 424-432. Springer, 2016.

A. Dai, et al., "Scannet: Richly-Annotated 3D Reconstructions of Indoor Scenes", In Proc. Computer Vision and Pattern Recognition (CVPR), IEEE, 2017.

J. Dai, et al., "R-fcn: Object Detection Via Region-Based Fully Convolutional Networks", In Advances in neural information processing systems, pp. 379-387, 2016.

D. Eigen, et al., "Predicting Depth, Surface Normal and Semantic Labels with a Common Multi-Scale Convolutional Architecture", In Proceedings of the IEEE International Conference on Computer Vision, pp. 2650-2658, 2015.

A. Geiger, et al., "Are We Ready for Autonomous Driving? The KITTI Vision Benchmark Suite." IEEE Conference on Computer Vision and Pattern Recognition (CVPR), 2012.

R. Girshick. Fast r-cnn. In Proceedings of the IEEE international conference on computer vision, pp. 1440-1448, 2015.

T. Hackel, et al., "Fast Semantic Segmentation of 3D Point Clouds with Strongly Varying Density", ISPRS Annals of Photogrammetry, Remote Sensing & Spatial Information Sciences, 3(3), 2016.

K. He, et al., "Deep Residual Learning for Image Recognition", In Proceedings of the IEEE conference on computer vision and pattern recognition, pp. 770-778, 2016.

J. Huang, et al., "Point Cloud Labeling Using 3D Convolutional Neural Network", In 2016 23rd International Conference on Pattern Recognition (ICPR), pp. 2670-2675, Dec. 2016.

S. Ioffe, et al. "Batch Normalization: Accelerating Deep Network Training by Reducing Internal Covariate Shift", In International Conference on Machine Learning, pp. 448-456, 2015.

D. Kingma, et al. "Adam: A method for Stochastic Optimization", arXiv preprint arXiv:1412.6980, 2014.

A. Krizhevsky, et al., "Imagenet Classification With Deep Convolutional Neural Networks", In Advances in neural information processing systems, pp. 1097-1105, 2012.

J. Long, et al., "Fully Convolutional Networks for Semantic Segmentation", In Proceedings of the IEEE Conference on Computer Vision and Pattern Recognition, pp. 3431-3440, 2015.

D. Maturana, et al., "VoxNet: A 3D Convolutional Neural Network for Real-Time Object Recognition", In IROS, 2015.

B. A. Olshausen, et al., Sparse Coding With an Over-Complete Basis Set: A Strategy Employed by v1? Vision research, 37(23):3311-3325, 1997.

C. R. Qi, et al., "Pointnet: Deep Learning on Point Sets for 3D Classification and Segmentation", In The IEEE Conference on Computer Vision and Pattern Recognition (CVPR), Jul. 2017.

C. R. Qi, et al., "Volumetric and Multi-View cnns for Object Classification on 3D Data", In Proc. Computer Vision and Pattern Recognition (CVPR), IEEE, 2016.

C. R. Qi, et al., "Pointnet++: Deep Hierarchical Feature Learning on Point Sets in a Metric Space", 2017.

X. Qi, et al., "3D Graph Neural Networks for rgbd Semantic Segmentation", In Proceedings of the IEEE Conference on Computer Vision and Pattern Recognition, pp. 5199-5208, 2017.

S. Ren, et al., "Faster r-cnn: Towards Real-Time Object Detection with Region Proposal Networks", In Advances in neural information processing systems, pp. 91-99, 2015.

G. Riegler, et al., "Octnet: Learning Deep 3D Representations at High Resolutions", In The IEEE Conference on Computer Vision and Pattern Recognition (CVPR), Jul. 2017.

O. Ronneberger, et al., "U-net: Convolutional Networks for Biomedical Image Segmentation", In Medical Image Computing and Computer-Assisted Intervention (MICCAI), vol. 9351 of LNCS, pp. 234-241. Springer, 2015. (available on arXiv:1505.04597 [CS.CV]).

K. Simonyan, et al., "Very Deep Convolutional Networks for Large-Scale Image Recognition", arXiv preprint arXiv:1409.1556, 2014.

R. Socher, et al., "Convolutional-Recursive Deep Learning for 3D Object Classification", In Advances in Neural Information Processing Systems, pp. 656-664, 2012.

S. Song, et al., "Deep Sliding Shapes for Amodal 3D Object Detection in rgb-d Images", In Proceedings of the IEEE Conference on Computer Vision and Pattern Recognition, pp. 808-816, 2016.

H. Su, et al., "Multi-View Convolutional Neural Networks for 3D Shape Recognition", In Proc. ICCV, 2015.

C. Szegedy, et al., "Going Deeper With Convolutions", In Proceedings of the IEEE conference on computer vision and pattern recognition, pp. 1-9, 2015.

L. P. Tchapmi, et al., "Segcloud: Semantic Segmentation of 3D Point Clouds", In International Conference on 3D Vision (3DV), 2017.

M. Velas, et al., "CNN for Very Fast Ground Segmentation in Velodyne Lidar Data", CoRR, abs/1709.02128, 2017.

M. Weinmann, et al., "Feature Relevance Assessment for the Semantic Interpretation of 3D Point Cloud Data", ISPRS Annals of the Photogrammetry, Remote Sensing and Spatial Information Sciences, 5:W2, 2013.

M. Weinmann, et al., "Distinctive 2D and 3D Features for Automated Largescale Scene Analysis in Urban Areas", Computers & Graphics, 49:47-57, 2015.

H. Zhao, et al., "Pyramid Scene Parsing Network", arXiv preprint arXiv:1612.01105, 2016.

\* cited by examiner

US 10,970,553 B2

SEMANTIC SEGMENTATION OF THREE-DIMENSIONAL DATA

PRIORITY CLAIM

The present application is based on and claims priority to U.S. Provisional Application 62/586,777 having a filing date of Nov. 15, 2017, which is incorporated by reference herein.

FIELD

The present disclosure relates generally to performing semantic segmentation of three-dimensional data.

BACKGROUND

Semantic scene understanding is valuable for a wide range of applications in fields such as graphics, human-computer interaction, image search, autonomous driving and many others. For example, an autonomous vehicle can observe its surrounding environment using a variety of sensors and can attempt to comprehend the environment by performing various processing techniques on data collected by the sensors. Semantic understanding of such an environment can help the vehicle navigate.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of semantic segmentation. The method includes obtaining, by a computing system including one or more computing devices, sensor data including three-dimensional data associated with an environment. The three-dimensional data includes a plurality of points. The method includes determining, by the computing system, data indicative of a two-dimensional voxel representation associated with the environment based at least in part on the three-dimensional data. The method includes accessing, by the computing system, a machine-learned semantic segmentation model. The method includes providing as an input, by the computing system, the data indicative of the two-dimensional voxel representation associated with the environment into the machine-learned semantic segmentation model. The method includes obtaining, by the computing system, an output from the machine-learned semantic segmentation model. The output is indicative of a classification for each point of the plurality of points.

Another example aspect of the present disclosure is directed to a computing system. The computing system includes one or more processors and one or more tangible, non-transitory, computer readable media that collectively store instructions that when executed by the one or more processors cause the computing system to perform operations. The operations include obtaining sensor data including three-dimensional data associated with an environment. The three-dimensional data includes a plurality of points, and the sensor data is associated with one or more times. The operations include determining data indicative of a two-dimensional voxel representation associated with the environment based at least in part on the three-dimensional data. The operations include determining a classification for each point of the plurality of points within the three-dimensional data based at least in part on the two-dimensional voxel representation associated with the environment and a machine-learned semantic segmentation model.

Yet another example aspect of the present disclosure is directed to one or more tangible, non-transitory, computer-readable media that collectively store instructions that, when executed by one or more processors, cause the one or more processors to perform operations. The operations include obtaining sensor data including three-dimensional data associated with an environment. The three-dimensional data includes a plurality of points. The operations include determining data indicative of a two-dimensional voxel representation associated with the environment based at least in part on the three-dimensional data. The two-dimensional voxel representation is associated with one or more voxels. The operations include determining a voxel classification for each voxel associated with the two-dimensional voxel representation based at least in part on the two-dimensional voxel representation. The operations include determining a classification for each point of the plurality of points within the three-dimensional data based at least in part on the voxel classification for each voxel.

Other example aspects of the present disclosure are directed to systems, methods, vehicles, apparatuses, tangible, non-transitory computer-readable media, and memory devices for semantic segmentation of an environment.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
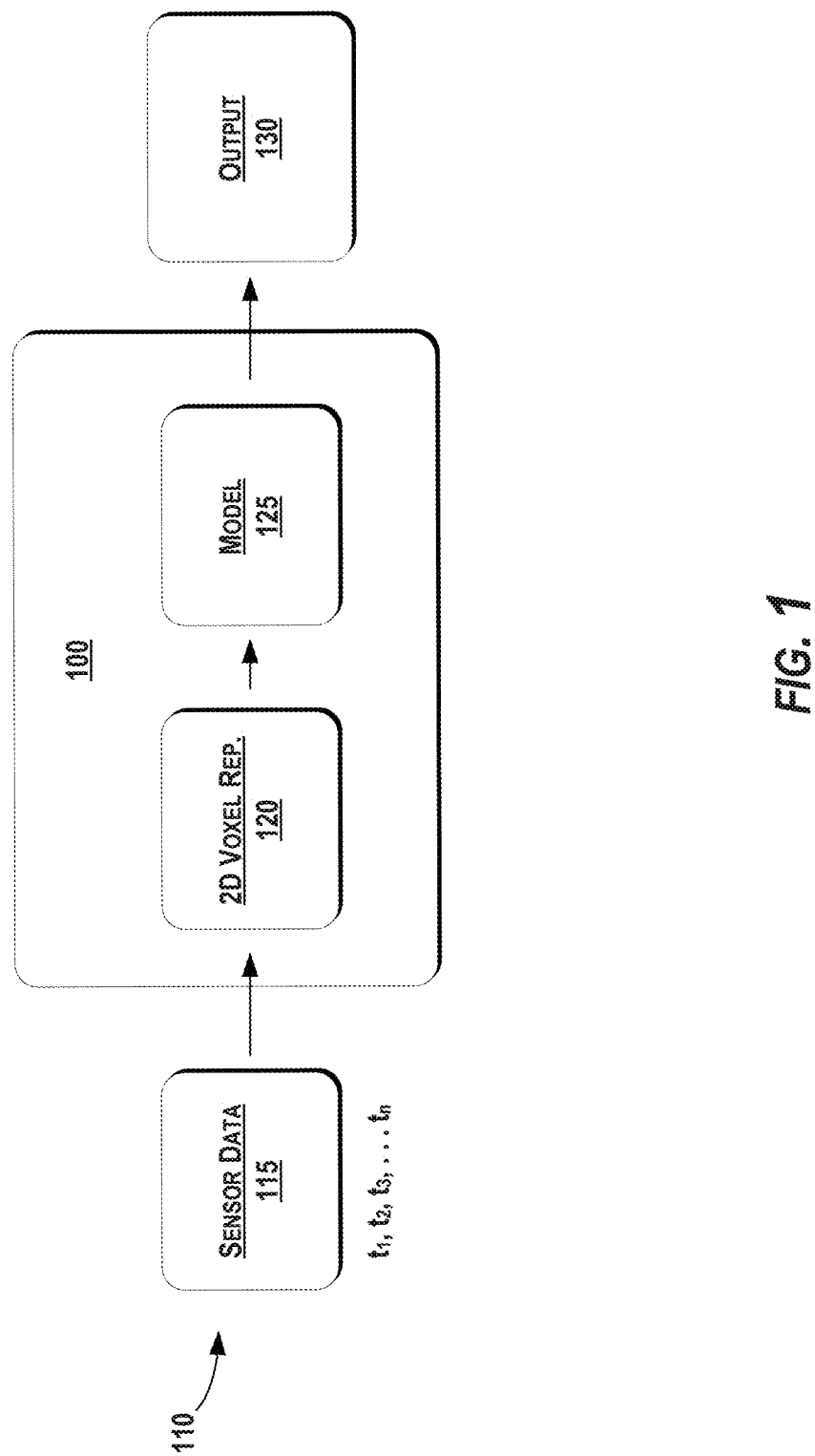
FIG. 1 depicts an example computing system and processing pipeline according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

The present disclosure is directed to improved systems and methods for real-time semantic segmentation of three-dimensional data. For instance, a computing system can obtain sensor data associated with an environment. The sensor data can include, for example, a three-dimensional point cloud associated with an outdoor environment (e.g., surrounding an autonomous vehicle) and/or an indoor environment (e.g., a room, etc.). The computing system can generate a two-dimensional voxel representation of the three-dimensional data (e.g., of the three-dimensional point clouds) that can be ingested by a machine-learned model. For example, the two-dimensional voxel representation can include a simple occupancy grid with the gravitational axis as a feature channel. This two-dimensional voxel representation can be input into a machine-learned semantic segmentation model (e.g., a convolutional neural network) trained to determine a semantic classification for each point (e.g., of a three-dimensional point cloud). By way of example, an autonomous vehicle can be travelling within a travel way with another object. The autonomous vehicle can acquire LIDAR data including a three-dimensional point cloud associated with that object (e.g., another vehicle). The autonomous vehicle (e.g., its onboard computing system) can generate a two-dimensional voxel representation of the three-dimensional point cloud. The machine-learned semantic segmentation model can be used to predict that a voxel associated with the object should be classified as a vehicle object. Moreover, the model can project that voxel classification back into the three-dimensional point cloud to determine which points should be classified as being associated with the other vehicle in the travel way. In this way, the systems and methods of the present disclosure can provide a fine-grained and more efficient approach to real-time three-dimensional data segmentation of various environments for safety critical tasks such as, for example, autonomous vehicle operation.

More particularly, the systems and methods of the present disclosure can be utilized for semantic segmentation of a variety of scenes. For example, as described herein, the systems and methods can be utilized by an autonomous vehicle for segmentation of its surrounding environment (e.g., as the vehicle is travelling). In some implementations, the systems and methods can be utilized to provide semantic scene understanding of an indoor environment such as, for example, a room within a building.

In order to perform a semantic segmentation of the different portions of an environment, a computing system can obtain sensor data associated with the environment. The sensor data can include three-dimensional data associated with the environment. The three-dimensional set of data can include a plurality of points. The plurality of points can be included within a three-dimensional point cloud associated with the environment. The sensor data can be acquired from a variety of different sensor types. For example, the sensor data can be LIDAR data acquired via a LIDAR system (e.g., mounted on an autonomous vehicle). Additionally, or alternatively, the sensor data can be motion sensor data that is acquired via one or more motion sensors (e.g., located within a confined indoor setting). In some implementations, the sensor data can include camera data acquired via one or more cameras (e.g., stereo cameras, etc.) and/or other types of sensors (e.g., RADAR, sonar, etc.).

In some implementations, the sensor data can be associated with a plurality of times. For example, the sensor data can include three-dimensional data (e.g., three-dimensional point cloud data) captured at a plurality of different time stamps. For example, the sensor data can be indicative of a three-dimensional LIDAR point cloud acquired at a first time, a second time, a third time, etc. These times can be associated with, for example, a time sequence as an autonomous vehicle travels through an outdoor environment (e.g., along a travel way).

The computing system can determine data indicative of a two-dimensional voxel representation associated with the environment based at least in part on the three-dimensional data. More particularly, the computing system can discretize the three-dimensional data into a representation that can be ingested by a machine-learned model architecture. For instance, the computing system can generate a voxel grid associated with a plurality of voxel cells based at least in part on the three-dimensional set of data. The voxel grid can be represented by two horizontal axes (e.g., x-axis, y-axis, etc.) and vertical axis (e.g., z-axis, gravitational axis, etc.). The voxel grid can be defined in a three-dimensional Euclidian space that encompasses all or at least a portion of the plurality of points of the three-dimensional data. Each voxel cell can be characterized with one or more channels. For example, a first channel can be an occupancy channel. The occupancy channel can be set to "1" if at least one point lies within the voxel cell or "0" if there is not a point which lies within the voxel cell. One or more second channels can be encoded with one or more sensor modalities associated with the sensor data. For example, RGB information could be encoded in three additional channels. Other sensor modalities that can be encoded into channel(s) include, for example, intensity, speed (e.g., of LIDAR returns), other image features, etc. Additional channels can be indicative of other information such as, for example, time information.

The computing system can generate the two-dimensional voxel representation based at least in part on the voxel grid. For example, the two-dimensional voxel representation can be a two-dimensional bird's eye view of the voxel grid, with the vertical axis (e.g., a gravitational, z-axis) as a feature channel. Other information can be encoded as additional channels. For example, sensor information encoded as additional channels in each voxel cell can be flattened, resulting in a matrix of size L×W×(HC), with Length (L), Width (W), and Height (H) representing the dimensions of the voxel grid, and (C) representing the number of channels in each voxel cell. Additionally, or alternatively, in the event that the sensor data is associated with a plurality of time stamps, the time stamps can be flattened and represented as a channel associated with the two-dimensional voxel representation. In some implementations, time can be treated as a separate dimension.

The computing system can perform a semantic segmentation of the environment based at least in part on the two-dimensional voxel representation. For instance, the computing system can utilize the two-dimensional voxel representation to determine a classification for one or more portions of the environment (e.g., for the points of the point clouds associated therewith). As further described herein, the classifications can characterize that portion of the environment. According to the present disclosure, such semantic segmentation can be accomplished using a two-stage process. First, the computing system can determine a voxel classification for each voxel of the voxel representation based at least in part on the two-dimensional voxel representation. Second, the computing system can determine a point classification for each point of (at least a portion of) the plurality of points within the three-dimensional data based at least in part on the voxel classification for each voxel.

In order to perform the semantic segmentation, the computing system can include, employ, and/or otherwise leverage one or more machine-learned model(s) such as, for example, a machine-learned semantic segmentation model. The semantic segmentation model can be or can otherwise include one or more various model(s) such as, for example, neural networks (e.g., deep neural networks). The neural networks can include, for example, convolutional neural network(s). In some implementations, the machine-learned semantic segmentation model can include a model architecture for a two-dimensional fully convolutional neural network. Additionally, or alternatively, the machine-learned semantic segmentation model can include an encoder and decoder network. The machine-learned semantic segmentation model can be trained (e.g., on a per-voxel basis) to predict a voxel classification for each voxel of the voxel representation. For example, the computing system can access a machine-learned semantic segmentation model (e.g., from a local memory, from a memory that is remote from the system, etc.). The computing system can provide, as an input, data indicative of the two-dimensional voxel representation associated with the environment into the machine-learned semantic segmentation model. In some implementations, for sensor data associated with a plurality of times, each time can be provided as its own channel in a time dimension (e.g., a four dimensional tensor). In some implementations, the points of the three-dimensional data set can be collapsed into a single frame (e.g., the last time frame). In some implementations, the computing system can employ a combination of these two approaches. For example, based on previous predictions, the model can be configured to identify certain points as associated with static object(s) (e.g., a lamp post, sidewalk, etc.) and other points as associated with dynamic object(s) (e.g., a moving vehicle, a walking pedestrian, etc.). Points associated with static objects can be collapsed into a single frame, while points associated with dynamic object(s) may not.

The machine-learned semantic segmentation model can process the two-dimensional voxel representation to determine voxel classifications for each voxel. For instance, the machine-learned semantic segmentation model can determine a probability distribution across a plurality of classes for each voxel. The machine-learned semantic segmentation model can predict a voxel classification for each voxel based at least in part on the associated probability distribution. For example, a softmax can be applied to determine a voxel classification for each voxel.

The machine-learned semantic segmentation model can be trained to determine a classification for the point(s) within the three-dimensional dataset based at least in part on the voxel classification(s). For instance, the machine-learned semantic segmentation model can project the voxel classification for each voxel into the three-dimensional dataset to determine a classification for each point within the three-dimensional data. By way of example, the machine-learned semantic segmentation model can bi-linearly interpolate the per-voxel predictions in a downscaled voxel grid back to its original size. The model can utilize an interpolation method (e.g., nearest neighbor, etc.) to obtain per-point predictions for the points of a particular voxel. In some implementations, the machine-learned semantic segmentation model can be trained to take into account its calculated uncertainty (e.g., via an aggregate function, etc.) when formulating its classification predictions.

The computing system can obtain an output from the machine-learned semantic segmentation model. The output can be indicative of a classification for each point of (at least a portion of) the plurality of points within the three-dimensional data. By way of example, for an outdoor environment (e.g., surrounding an autonomous vehicle, etc.), the output can indicate that a point is associated with one of the following classes: vehicle, pedestrian, bicyclist, animal, motorcycle, road, background, and/or other classes. In another example, for an indoor environment (e.g., a room, etc.), the output can indicate that a point is associated with one of the following classes: ceiling, wall, column, door, chair, bookcase, floor, beam, window, table, sofa, board, clutter, and/or other classes. In the event that the sensor data is associated with a plurality of times, the output can be indicative of the classification for each point at each of the plurality of times or at least one of the times (e.g., an aggregate of predictions at each time). This can provide a more robust class estimation.

Various actions can be performed based on the semantic segmentation of the points of the environment. For example, as described herein, the computing system utilizing the machine-learned semantic segmentation model can be implemented via the onboard vehicle computing system of an autonomous vehicle. As such, the vehicle computing system can initiate the performance of one or more vehicle actions by the autonomous vehicle based at least in part on the predicted point classification(s). By way of example, the vehicle computing system (e.g., an onboard perception system) can utilize the per-point classifications to detect and track the objects that are within the surrounding environment of the autonomous vehicle. Ultimately, the autonomous vehicle can generate a motion plan through its surrounding environment based at least in part on the detected objects (e.g., to avoid, pass, follow, yield for, etc. the objects).

The systems and methods described herein provide a number of technical effects and benefits. For instance, the systems and methods of the present disclosure provide an improved approach for semantic segmentation of a three-dimensional dataset associated with an environment (e.g., a three-dimensional point cloud, etc.). For example, the systems and methods of the present disclosure provide efficient, real-time processing of point clouds with machine-learned model(s) (e.g., deep neural networks). The systems and methods of the present disclosure are able to leverage these machine-learned models (e.g., convolution neural networks) to learn hierarchical features with varying contextual scales. This allows the model(s) to more efficiently produce classifications of the points within the three-dimensional data. Moreover, the approach described herein is generalizable and scalable as it can be applied to varying types of data (e.g., from various types of sensors, associated with various types of environments, from one or more time frames, etc.).

Ultimately, the systems and methods of the present disclosure provide for faster processing and a better use of memory resources, which can be particularly advantageous for safety critical tasks. For example, an autonomous vehicle can more efficiently segment its surrounding environment, which can lead to faster (and safer) object detection, tracking, object motion prediction, and vehicle motion planning.

The systems and methods of the present disclosure also provide an improvement to vehicle computing technology, such as machine-learned related computing technology. For instance, the systems and methods of the present disclosure can leverage machine-learned models and sensor data to more accurately perform semantic segmentation of the portion(s) of an environment. For example, a computing system can obtain sensor data including three-dimensional data associated with an environment (e.g., an outdoor environment, an indoor environment). The three-dimensional data can include a plurality of points (e.g., a three-dimensional point cloud associated with the environment). The computing system can determine data indicative of a two-dimensional voxel representation associated with the environment based at least in part on the three-dimensional set of data. This can help generate an improved set of input data that can be ingested by a machine-learned model. The computing system can access and provide, as an input, the data indicative of two-dimensional voxel representation associated with the environment into a machine-learned semantic segmentation model. The machine-learned semantic segmentation model can be configured to predict a voxel classification for each voxel associated with the two-dimensional representation and project that back into the three-dimensional data to obtain a classification for at least a portion of the points within the three-dimensional data. The computing system can obtain an output from the model. The output can be indicative of a classification for each point of (at least a portion of) the plurality of points within the three-dimensional data. By utilizing a two-dimensional voxel representation of a three-dimensional dataset, the computing system can more efficiently obtain a fine-grained semantic segmentation of an environment. The generated two-dimensional voxel representation is simple, memory efficient, and fast. It provides a precise representation of the three-dimensional data, while also leading to less wasted computations. Moreover, the use of initial per-voxel classifications (e.g., that can be projected to make the per-point predictions) can allow the model(s) described herein to be trained on a per-voxel basis. This can lead to model training that is less computationally costly. Accordingly, the systems and methods of the present disclosure provide a semantic segmentation approach that is more computationally efficient (e.g., for training and execution) and provides faster performance and safer operation of associated tasks (e.g., autonomous driving related tasks).

With reference now to the FIGS., example embodiments of the present disclosure will be discussed in further detail. FIG. 1 depicts an example system 100 according to example embodiments of the present disclosure. The computing system 100 can be configured to implement the processing pipeline 110 in order to perform semantic segmentation for a variety of environments.

In some implementations, the environment can be an outdoor environment. For instance, the environment can be associated with a vehicle. The computing system 100 can be utilized by a vehicle for segmentation of its surrounding environment (e.g., as the vehicle is travelling). At least a portion of the computing system 100 can be located onboard the vehicle (e.g., an autonomous vehicle). By way of example, the computing system 100 can be implemented as a portion of the vehicle's onboard computing system. Additionally, or alternatively, at least a portion of the computing system 100 may not be included onboard a vehicle. For example, the computing system 100 can be or can otherwise be included within a system with which a vehicle can communicate (e.g., a remote operations computing system).

Figure 2A:
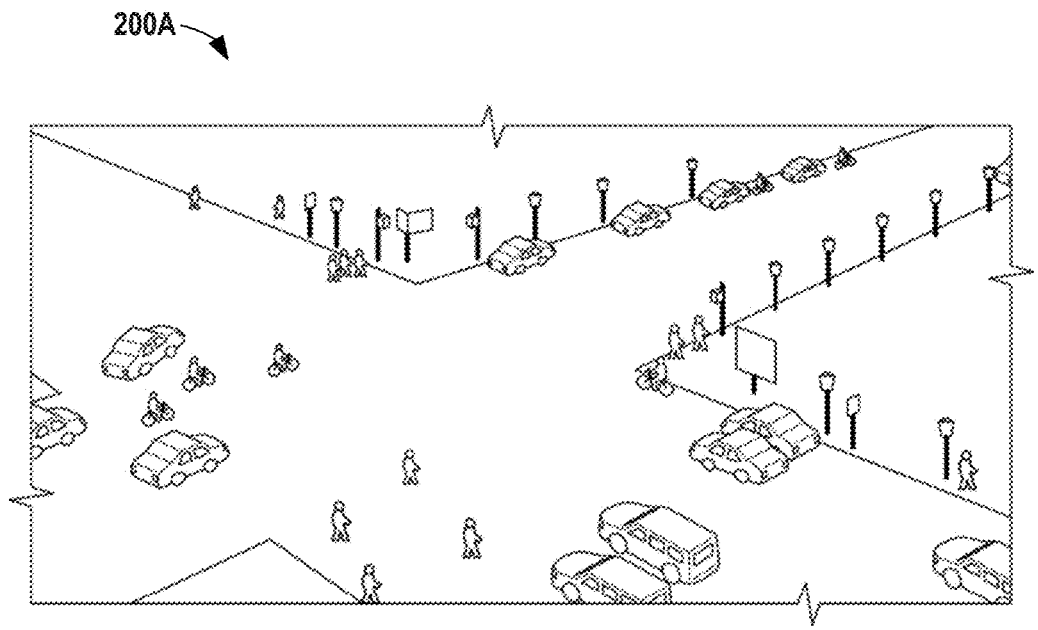
FIGS. 2A-B depict example environments according to example embodiments of the present disclosure.

FIG. 2A presents an example outdoor environment 200A. The outdoor environment 200A can include one or more travel ways (e.g., intersecting roadways). The scene illustrated in the outdoor environment 200A can include one or more static and/or dynamic objects (e.g., pedestrians, vehicles, bicyclists, sidewalks, lampposts, signage, etc.). The environment 200A can be an environment in which a vehicle is and/or will be travelling. The environment 200A shown in FIG. 2A is presented by way of example only and is not intended to be limiting. For example, the systems and methods of the present disclosure can be utilized with outdoor environments that are not associated with a vehicle.

Figure 2B:
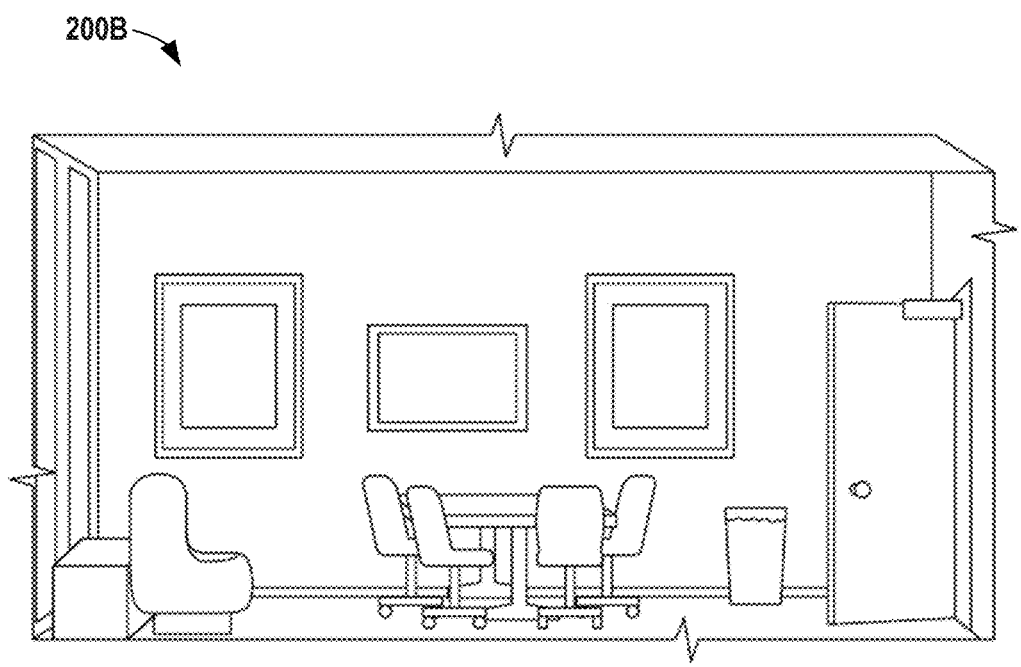

In some implementations, the computing system 100 can be a system that is not associated with a vehicle. For instance, the computing system 100 can be associated with one or more structures and/or environments that are not related to a vehicle. The computing system 100 can be utilized to provide semantic scene understanding of an indoor environment such as, for example, a room within a building. FIG. 2B presents an example indoor environment 200B. The scene illustrated in the indoor environment 200B can include one or more static and/or dynamic objects. For example, the indoor environment (e.g., a room, etc.) can include structural objects (e.g., beams, columns, walls, ceilings, floors, etc.), moveable objects (e.g., chairs, tables, doors, etc.), clutter, and/or other objects. The environment 200B shown in FIG. 2B is presented by way of example only and is not intended to be limiting.

Returning to FIG. 1, in order to perform a semantic segmentation of the different portions of an environment 200A-B, the computing system 100 can obtain sensor data 115 associated with the environment. For instance, the computing system 100 can obtain sensor data 115 including three-dimensional data associated with an environment 200A-B. The three-dimensional data can include a plurality of points. The plurality of points can be included within a three-dimensional point cloud associated with the environment 200A-B. This sensor data can include a larger point cloud as input (e.g., a point cloud associated with the entire scene of the environment), giving the model(s) described herein a larger receptive field.

Figure 3A:
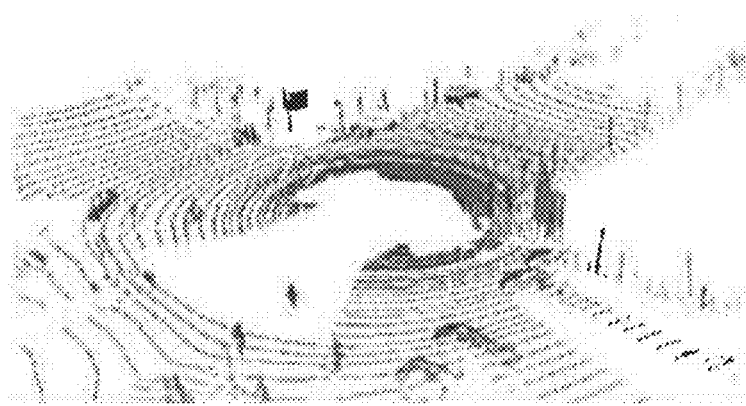
FIGS. 3A-B depict diagrams of example sensor data according to example embodiments of the present disclosure.
Figure 3B:
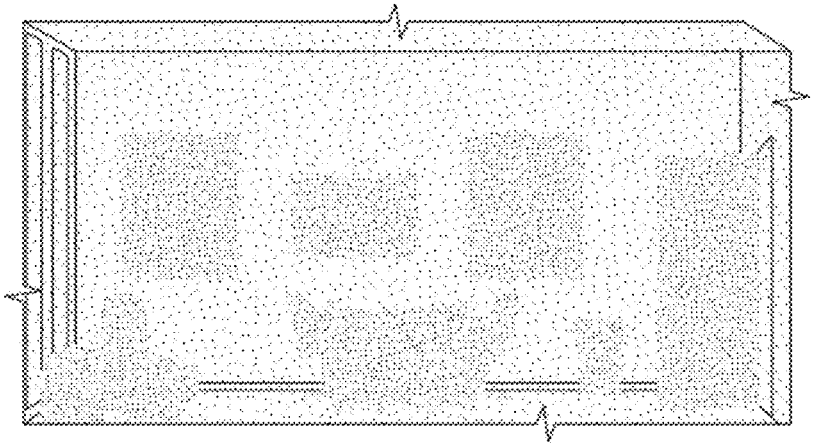

The sensor data 115 can be acquired from a variety of different sensor types. For example, the sensor data 115 can be LIDAR data acquired via a LIDAR system (e.g., mounted on a vehicle). FIG. 3A depicts an example three-dimensional point cloud of the outdoor environment 200A. The three-dimensional point cloud shown in FIG. 3A can include a point cloud acquired via a LIDAR system (e.g., of a vehicle). Additionally, or alternatively, the sensor data 115 can be camera data that is acquired via one or more cameras (e.g., three-dimensional camera(s), stereo camera(s), etc.). By way of example, FIG. 3B depicts an example three-dimensional point cloud of the indoor environment 200B. The three-dimensional cloud shown in FIG. 3B can be generated by one or more three-dimensional scans of the environment 200B (e.g., from one or more sensors located within a confined indoor setting). In some implementations, the sensor data can include motion sensor data that is acquired via one or more motion sensors and/or other types of sensors (e.g., RADAR, sonar, etc.).

Returning to FIG. 1, in some implementations, the sensor data 115 can be associated with one or more time stamps. For example, the sensor data 115 can include three-dimensional data (e.g., three-dimensional point cloud data) captured at a plurality of different times. For example, the sensor data 115 can be indicative of a three-dimensional LIDAR point cloud acquired at a first time ($t_1$), a second time ($t_2$), a third time ($t_3$), etc. These times can be associated with, for example, a time sequence as a vehicle travels through an outdoor environment 200A (e.g., along a travel way) and/or a series of times at which sensor data associated with an indoor environment 200B is acquired.

The computing system 100 can determine data indicative of a two-dimensional voxel representation 120 associated with an environment 200A-B based at least in part on the sensor data 115 (e.g., the three-dimensional data). By doing so, the computing system 100 can discretize the three-dimensional data into a representation that can be ingested by a machine-learned model architecture.

Figure 4:
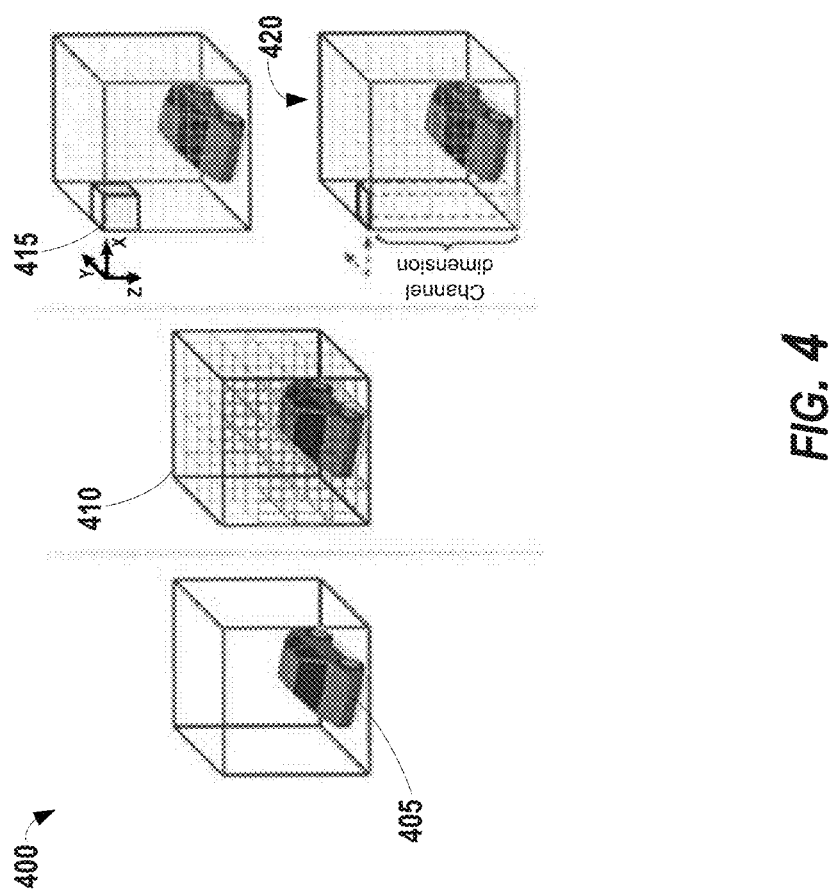
FIG. 4 depicts a diagram of an example voxel grid and voxel representation according to example embodiments of the present disclosure.

For instance, FIG. 4 depicts a diagram 400 illustrating the generation of an example two-dimensional voxel representation. With reference to FIG. 4, an object 405 can be located within the environment of interest. The computing system 100 can generate a voxel grid 410 based at least in part on the three-dimensional data. The voxel grid 410 can be represented by two horizontal axes (e.g., x-axis, y-axis, etc.) and a vertical axis (e.g., z-axis, gravitational axis, etc.). The voxel grid 410 can be defined in a three-dimensional Euclidian space that encompasses all or at least a portion of the plurality of points of the three-dimensional data. For example, the voxel grid 410 can confine one or more points associated with the object 405 (e.g., located within an environment 200A-B). Given a set of observations $O=\{o_1\}$ representing a three-dimensional set of data (e.g., a three-dimensional point cloud), the computing system 100 can predict a probability distribution across (K) classes for all ($o_1$), where each ($o_1$) is a vector consisting of ($p_1$) representing its (x, y, z) location in Euclidean space and ($m_1$) representing any other available sensor modalities (e.g., RGB, intensity, etc.). (O) can be discretized into a representation that can be ingested by a model (e.g., with a convolutional neural network architecture). A three-dimensional voxel grid 410 (e.g., $V=\{v_{x,y,z}\}$) can be defined in the Euclidean space to encompass all ($p_1$). The voxel grid 410 (V) can include one or more voxels 415 (e.g., $v_{x,y,z}$). Each voxel 410 ($v_{x,y,z}$) can be centered at ($\hat{x},\hat{y},\hat{z}$) and can have a length, width, and height (l, w, h) respectively. Each voxel 410 ($v_{x,y,z}$) can be characterized with one or more channels. For example, a first channel can be an occupancy channel. The occupancy channel can be set to "1" if at least one point lies within the voxel cell or "0" if there is not a point which lies within the voxel cell. One or more second channels can be encoded with one or more sensor modalities associated with the sensor data 115. For example, RGB information could be encoded in three additional channels. Other sensor modalities that can be encoded into channel(s) include, for example, intensity, speed (e.g., of LIDAR returns), other image features, etc. Additional channels can be indicative of other information such as, for example, time information. In some implementations, in the event that multiple points lie within the same voxel 415 ($v_{x,y,z}$), a simple pooling operation can be performed.

The computing system 100 can generate the two-dimensional voxel representation 420 based at least in part on the voxel grid 410. The two-dimensional voxel representation 120 can be or otherwise include the two-dimensional voxel representation 420. The three-dimensional voxel grid 410 can be converted into a two-dimensional representation 420, with a simple regular binary occupancy grid. This can allow for sparsity-invariant efficient computation with out-of-the-box methods of deep learning frameworks. Moreover, this allows the computing system 100 to compute fine-grained predictions in three-dimensions using a two-dimensional representation and the two-dimensional representation in Euclidean space is amenable to a wide range of applications. Moreover, the model(s) described herein can learn directly from the occupancy grid (e.g. rather than a relying on a hand-crafted feature in the height dimension).

The two-dimensional voxel representation 420 can include a two-dimensional bird's eye view of the voxel grid 410. The two-dimensional voxel representation 420 can be associated with one or more voxels 415. The two-dimensional voxel representation 420 can be associated with at least one channel that is indicative of the vertical axis of the voxel grid 410. The computing system 100 can use a single feature vector computed for all voxels in the same (Z) extent to make individual predictions for each voxel. For example, the voxel grid 410 (V) with voxel(s) 410 ($v_{x,y,z}$) can be treated as a voxel image (V') with voxel patches ($v'_{x,y,z}$). The voxel image (V') can be a bird's eye view of the voxel grid (V), with the vertical axis (e.g., gravitational axis, z-axis, etc.) as a feature channel. Other information can be encoded as additional channel(s). For example, sensor information encoded as additional channels in each voxel cell can be flattened, resulting in a matrix of size L×W×(HC), with Length (L), Width (W), and Height (H) representing the dimensions of the voxel grid, and (C) representing the number of channels in each voxel cell. Additionally, or alternatively, in the event that the sensor data 115 is associated with a plurality of time stamps, the time stamps can be flattened and represented as a channel associated with the two-dimensional voxel representation 120. In some implementations, time can be treated as a separate dimension.

Returning to FIG. 1, the computing system can perform a semantic segmentation of an environment 200A-B based at least in part on a two-dimensional voxel representation 120 (e.g., two-dimensional voxel representation 420). The computing system 100 can utilize the two-dimensional voxel representation 120 to determine a classification for one or more portions of the environment 200A-B. As further described herein, the classifications can characterize that portion of the environment 200A-B. According to the present disclosure, such semantic segmentation can be accomplished using a two-stage process. First, the computing system 100 can determine a voxel classification for each voxel 410 associated with the two-dimensional voxel representation 420 (e.g., of the voxel grid 410) based at least in part on the two-dimensional voxel representation 420. Then, the computing system 100 can determine a classification for each point of (at least a portion of) the plurality of points within the three-dimensional data based at least in part on the voxel classification for each voxel 410. One or both of these stages can be based at least in part on a model.

For instance, in order to perform the semantic segmentation, the computing system 100 can include, employ, and/or otherwise leverage one or more model(s) 125. The model(s) 125 can include one or more machine-learned model(s) such as, for example, a machine-learned semantic segmentation model. The machine-learned semantic segmentation model can be or can otherwise include one or more various model(s) such as, for example, neural networks (e.g., deep neural networks). The neural networks can include, for example, convolutional neural network(s).

The computing system 100 can determine a classification for each point of the plurality of points within the three-dimensional data based at least in part on the two-dimensional voxel representation 120 associated with the environment 200A-B and the model(s) 125 (e.g., a machine-learned semantic segmentation model). The model(s) 125 (e.g., a machine-learned semantic segmentation model) can be trained (e.g., on a per-voxel basis) to predict a voxel classification for each voxel associated with the two-dimensional voxel representation 120. For example, the computing system 100 can access the model(s) 125 (e.g., the machine-learned semantic segmentation model) from a local memory, from another computing device that is remote from the computing system 100, etc. The computing system 100 can provide, as an input, the data indicative of the two-dimensional voxel representation 120 associated with the environment 200A-B into the model(s) 125 (e.g., the machine-learned semantic segmentation model). For instance, the model(s) 125 (e.g., a convolutional neural network) can ingest the two-dimensional voxel representation 120 and compute per-voxel class scores and project the per-voxel class scores into the three-dimensional data (e.g., the three-dimensional point cloud) to obtain per-point class scores, as further described herein.

Sensor data 115 associated with a plurality of time stamps can be represented in a variety of manners. For example, as described herein, the two-dimensional voxel representation 120 can be associated with one or more channels. In some implementations, each time stamp can be provided as its own channel in a time dimension (e.g., a four dimensional tensor). In some implementations, the points of the three-dimensional data can be collapsed into a single frame (e.g., the last time frame). In some implementations, the computing system 100 can employ a combination of these two approaches. For example, based on previous predictions, certain points can be identified as associated with static object(s) (e.g., a lamp post, sidewalk, etc.) and other points as associated with dynamic object(s) (e.g., a moving vehicle, a walking pedestrian, etc.). Points associated with static objects can be collapsed into a single frame, while points associated with dynamic object(s) may not.

Figure 5A:
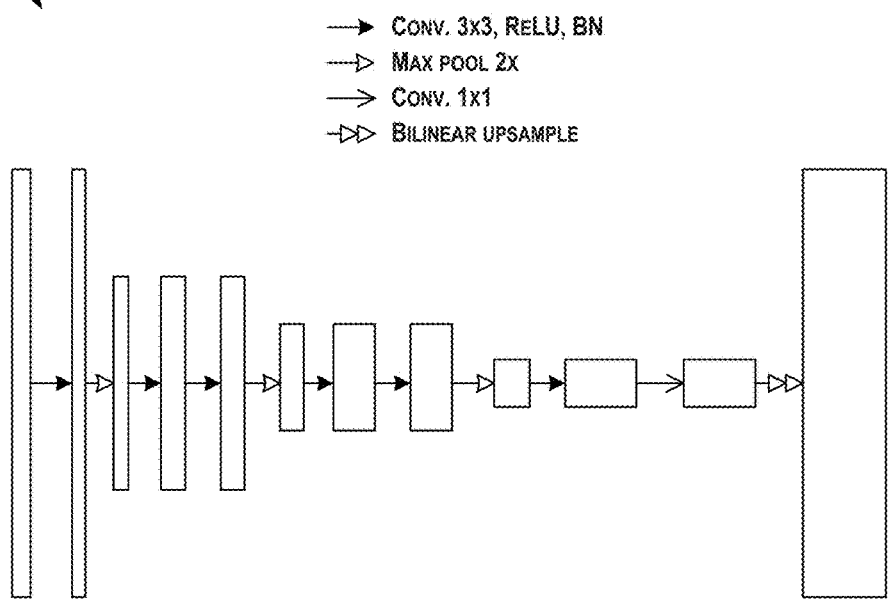
FIGS. 5A-B depict diagrams of example model architectures according to example embodiments of the present disclosure.

The model(s) 125 can include various model architectures trained to perform a semantic segmentation of an environment. In some implementations, the model(s) 125 (e.g., the machine-learned semantic segmentation model) can include a model architecture for a two-dimensional fully convolutional neural network. For example, FIG. 5A depicts a model architecture 500A associated with such a network. The model architecture 500A can take the two-dimensional voxel representation 120 (e.g., the voxel image V') as an input. The model architecture 500A can include a set of two-dimensional convolution layers (e.g., with kernel size 3 and stride 1, etc.), interlaced with two-dimensional max pooling layers (e.g., with kernel size 2 and stride 2, etc.). Each convolution layer can be followed with a rectified linear unit (ReLU) activation layer and batch normalization. The number of output channels each time can be downscaled, which can keep the amount of computation in each layer approximately equal.

Towards the final layers, the model architecture 500A can allow the model(s) 125 to learn to compute a feature vector ($f_{x,y}$) for each voxel patch ($v'_{x,y}$) in the downscaled voxel image (V'). With a two-dimensional voxel representation 120 that includes the two-dimensional bird's eye view of the voxel grid 410, the feature vector ($f_{x,y}$) corresponding to the voxel patch ($v'_{x,y}$) can be used to encode information for the voxel cells ($v_{x,y,z}$). For example, a single feature vector can encode class information for multiple voxel cells along the vertical axis (e.g., a gravitational axis, etc.). In such implementations, the feature vector ($f_{x,y}$) can be decoded using a convolution layer (e.g., 1×1 convolution layer), with H×K number of output channels, which can represent a separate probability distribution of a plurality of classifications (K) for each voxel cell ($v_{x,y,z}$).

A softmax can then be applied to each voxel cell in the down-scaled voxel grid to obtain class predictions. The predicted per-voxel classifications can be bilinearly interpolated in the downscaled voxel grid back to its original size. An interpolation technique (e.g., nearest neighbor interpolation) can be used to predict per-point classifications. Such an approach allows for the ability to train the model(s) 125 (e.g., the machine-learned semantic segmentation model) on a per-voxel metric rather than a per-point metric, which is less computationally costly.

Figure 5B:
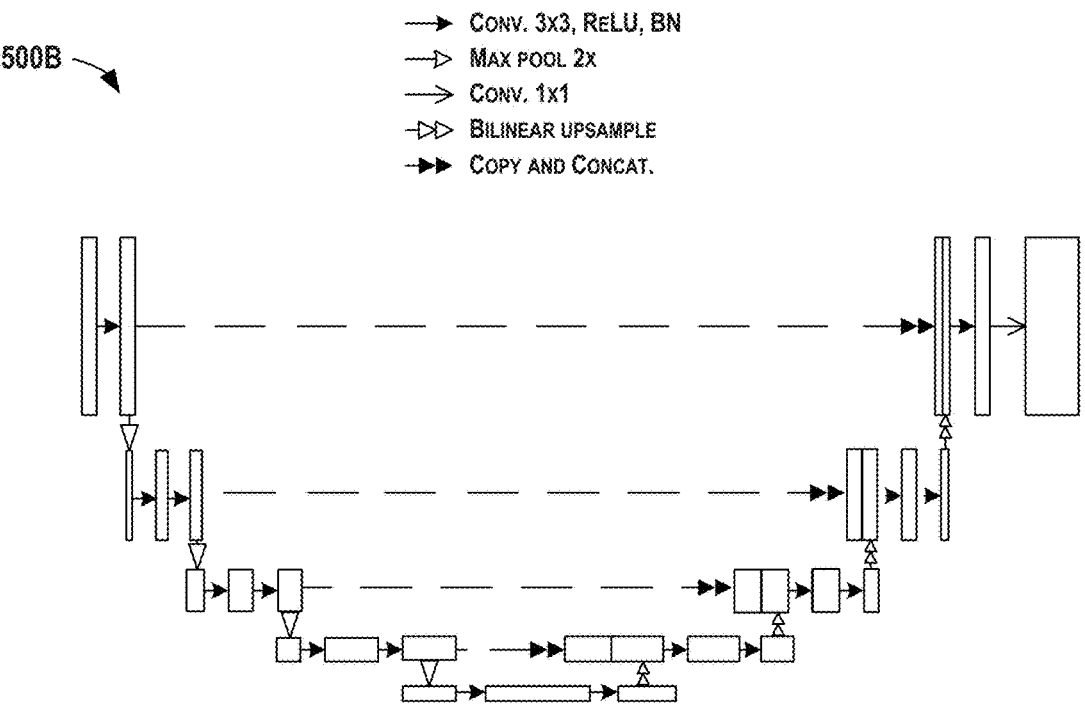

Additionally, or alternatively, the model(s) 125 (e.g., the machine-learned semantic segmentation model) can include an encoder and decoder network. For example, FIG. 5B depicts a model architecture 500B associated with such a network. The encoder network can include convolution and pooling layers, eventually learning strong, context-aware features, at the cost of lost boundary information during pooling. The decoder network can include convolution and bilinear upsampling layers, which further process the features learned by the encoder network. At each step, the activations from the corresponding layer in the encoder network can be copied and concatenated in the channel dimension. This can allow the model(s) 125 (e.g., the machine-learned semantic segmentation model) to see high definition boundary information while being aware of the larger context.

In some implementations, the model(s) 125 (e.g., the machine-learned semantic segmentation model) can employ the framework of three-dimensional convolutions. For example, a three-dimensional fully convolutional neural network can be include a first convolution layer (e.g., with a kernel size k×k×H) and subsequent convolution layers (e.g., with kernel size k×k×1).

Figure 6A:
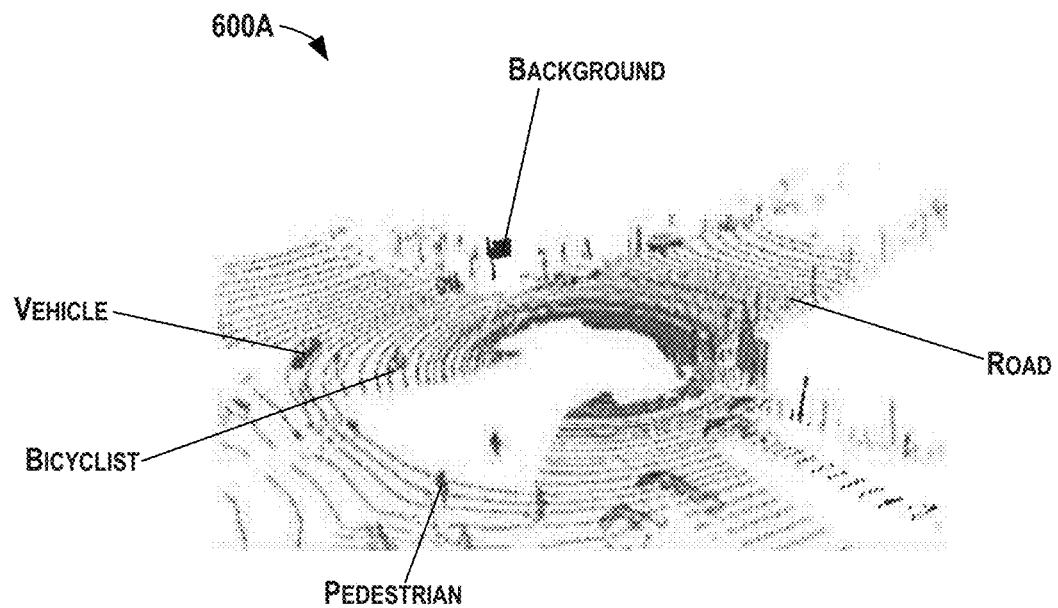
FIGS. 6A-B depict diagrams of example outputs according to example embodiments of the present disclosure.

Returning to FIG. 1, the computing system 100 can obtain an output 130 from the model(s) 125 (e.g., the machine-learned semantic segmentation model). The output 130 can be indicative of a classification for each point of (at least a portion of) the plurality of points within the three-dimensional data. For example, FIG. 6A depicts a representation of an example output 600A for an outdoor environment 200A (e.g., surrounding an autonomous vehicle, etc.). The output 130 of FIG. 1 can be or can otherwise include the output 600A. The output 600A can be indicative of a classification for each point (of at least a portion of) the LIDAR point cloud associated with the outdoor environment 200A. For example, the output 600A can indicate that a point is associated with one of the following classes: vehicle, pedestrian, bicyclist, animal, motorcycle, road, background, and/or other classes.

Figure 6B:
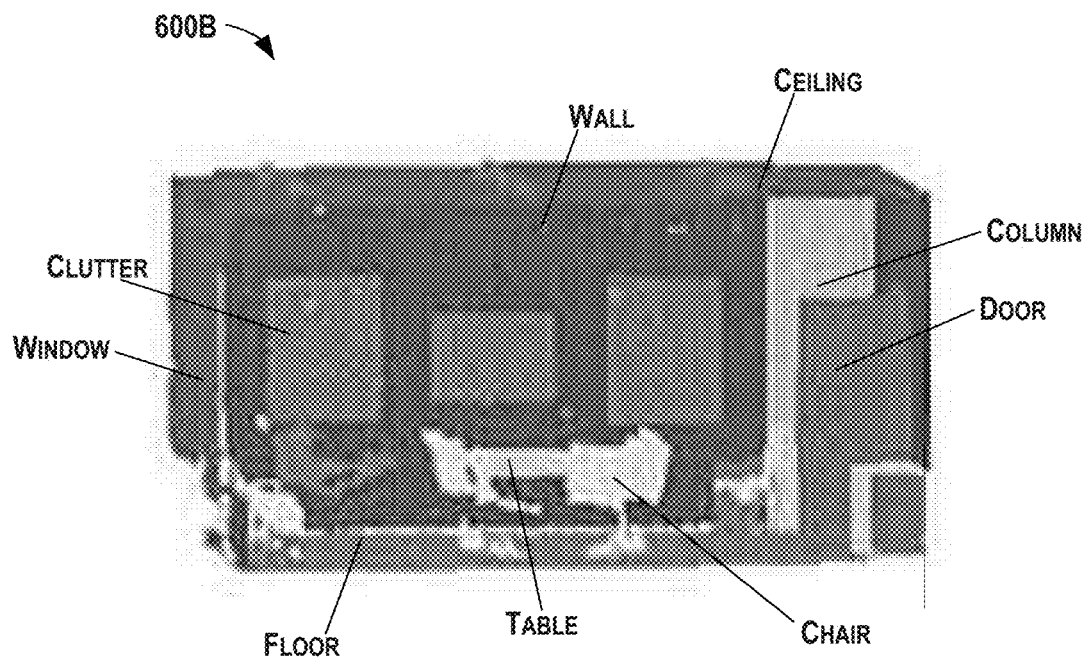

FIG. 6B depicts an example representation of another example output 600B. The output 600B can be an output associated with an indoor environment 200B (e.g., a room, etc.). The output 130 of FIG. 1 can be or can otherwise include the output 600B. The output 600B can be indicative of a classification for each portion (e.g., each point of at least a portion of the point cloud) of the indoor environment 200B. For example, the output 600B can indicate that portion (e.g., a point) is associated with one of the following classes: ceiling, wall, column, door, chair, bookcase, floor, beam, window, table, sofa, board, clutter, and/or other classes. In the event that the sensor data 115 is associated with a plurality of time stamps, the output 600A-B can be indicative of the classification for each point at each of the plurality of time stamps or at least one of the time stamps (e.g., an aggregate of predictions at each time). This can provide a more robust class estimation. In some implementations, the model(s) 125 (e.g., the machine-learned semantic segmentation model) can be trained to take into account its calculated uncertainty (e.g., via an aggregate function, etc.) when formulating its classification predictions.

Figure 7:
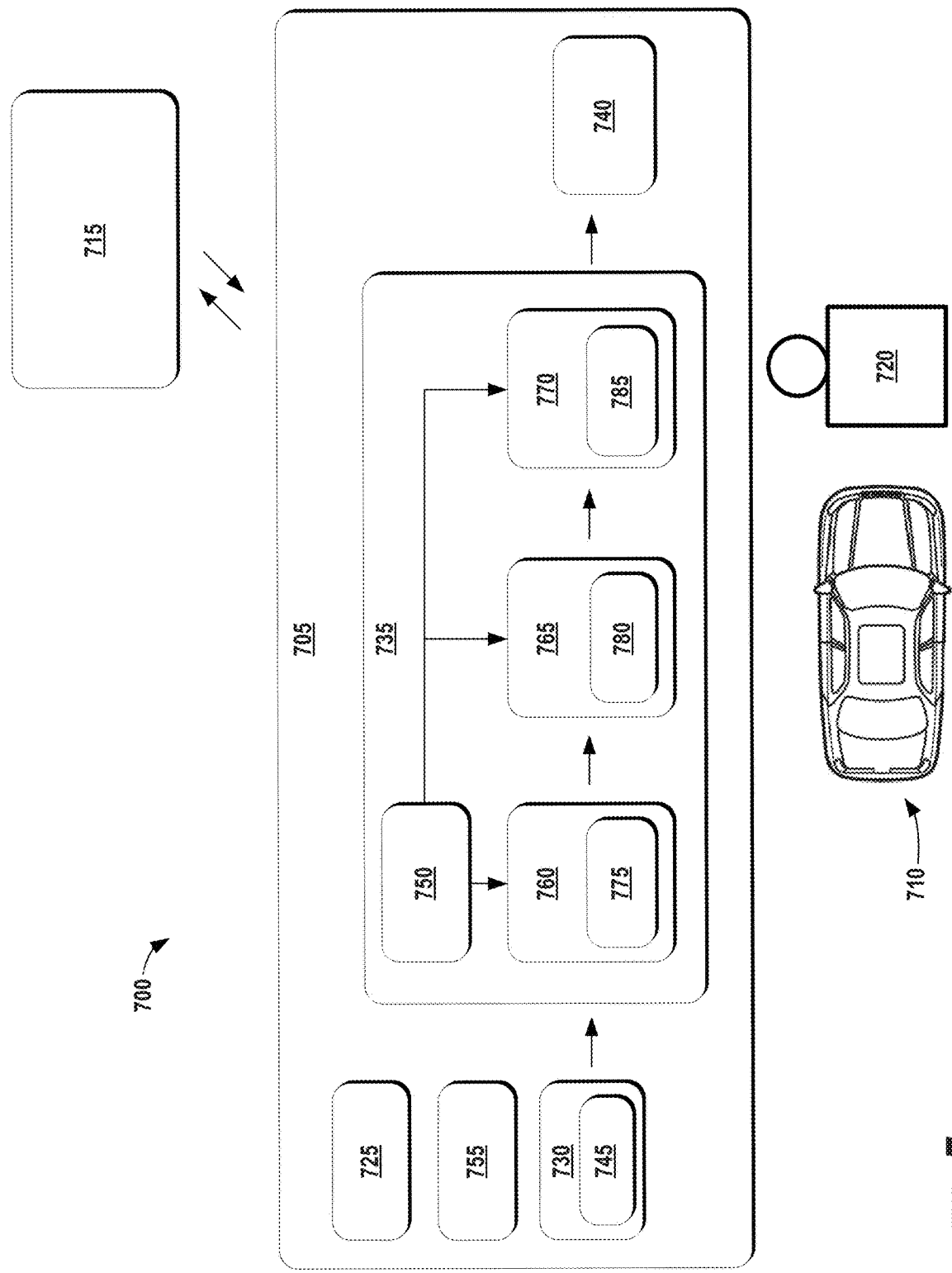
FIG. 7 depicts an example vehicle computing system overview according to example embodiments of the present disclosure.

The output of 120 of the model(s) 125 (e.g., the machine-learned semantic segmentation model) can be utilized to perform a variety of actions. For instance, as described herein, the computing system 100 can be located onboard a vehicle and/or can communicate with the onboard computing system of a vehicle. For example, FIG. 7 illustrates an example system 700 associated with a vehicle 710 according to example embodiments of the present disclosure. The vehicle 710 can include a vehicle computing system 705 which can communicate with an operations computing system 715 that is remote from the vehicle 710. The computing system 100 can be implemented, for example, via the vehicle computing system 705 (e.g., with at least a portion of the computing system located onboard the vehicle 710) and/or the operations computing system 715 (e.g., with at least a portion of the computing system 100 being remote from the vehicle 710).

In some implementations, the vehicle 710 can be associated with an entity (e.g., a service provider, owner, manager). The entity can be one that offers one or more vehicle service(s) to a plurality of users via a fleet of vehicles that includes, for example, the vehicle 710. In some implementations, the entity can be associated with only vehicle 710 (e.g., a sole owner, manager). In some implementations, the operations computing system 715 can be associated with the entity. The vehicle 710 can be configured to provide one or more vehicle services to one or more users 720. The vehicle service(s) can include transportation services (e.g., rideshare services in which user rides in the vehicle 710 to be transported), courier services, delivery services, and/or other types of services. The vehicle service(s) can be offered to the users 720 by the entity, for example, via a software application (e.g., a mobile phone software application). The entity can utilize the operations computing system 715 to coordinate and/or manage the vehicle 710 (and its associated fleet, if any) to provide the vehicle services to a user 720.

The operations computing system 715 can include one or more computing devices that are remote from the vehicle 710 (e.g., located off-board the vehicle 710). For example, such computing device(s) can be components of a cloud-based server system and/or other type of computing system that can communicate with the vehicle computing system 105 of the vehicle 710 (and/or a user device). The computing device(s) of the operations computing system 715 can include various components for performing various operations and functions. For instance, the computing device(s) can include one or more processor(s) and one or more tangible, non-transitory, computer readable media (e.g., memory devices, etc.). The one or more tangible, non-transitory, computer readable media can store (e.g., collectively store) instructions that when executed by the one or more processor(s) cause the operations computing system 715 (e.g., the one or more processors, etc.) to perform operations and functions, such as providing data to and/or obtaining data from the vehicle 710, for managing a fleet of vehicles (that includes the vehicle 710), performing semantic segmentation, etc.

The vehicle 710 incorporating the vehicle computing system 705 can be various types of vehicles. For instance, the vehicle 710 can be an autonomous vehicle that can drive, navigate, operate, etc. with minimal and/or no interaction from a human operator (e.g., driver). The vehicle 710 can be a ground-based autonomous vehicle such as an autonomous truck, autonomous car, autonomous bus, etc. The vehicle 710 can be an air-based autonomous vehicle (e.g., airplane, helicopter, or other aircraft) or other types of vehicles (e.g., watercraft, etc.). In some implementations, a human operator can be omitted from the vehicle 710 (and/or also omitted from remote control of the vehicle 710). In some implementations, a human operator can be included in the vehicle 710. In some implementations, the vehicle 710 can be a non-autonomous vehicle (e.g., ground-based, air-based, water-based, other vehicles, etc.).

In some implementations, the vehicle 710 can be configured to operate in a plurality of operating modes. The vehicle 710 can be configured to operate in a fully autonomous (e.g., self-driving) operating mode in which the vehicle 710 is controllable without user input (e.g., can drive and navigate with no input from a human operator present in the vehicle 710 and/or remote from the vehicle 710). The vehicle 710 can operate in a semi-autonomous operating mode in which the vehicle 710 can operate with some input from a human operator present in the vehicle 710 (and/or a human operator that is remote from the vehicle 710). The vehicle 710 can enter into a manual operating mode in which the vehicle 710 is fully controllable by a human operator (e.g., human driver, pilot, etc.) and can be prohibited and/or disabled (e.g., temporary, permanently, etc.) from performing autonomous navigation (e.g., autonomous driving). In some implementations, the vehicle 710 can implement vehicle operating assistance technology (e.g., collision mitigation system, power assist steering, etc.) while in the manual operating mode to help assist the human operator of the vehicle 710.

The operating modes of the vehicle 710 can be stored in a memory onboard the vehicle 710. For example, the operating modes can be defined by an operating mode data structure (e.g., rule, list, table, etc.) that indicates one or more operating parameters for the vehicle 710, while in the particular operating mode. For example, an operating mode data structure can indicate that the vehicle 710 is to autonomously plan its motion when in the fully autonomous operating mode. The vehicle computing system 705 can access the memory when implementing an operating mode.

The vehicle computing system 705 can include one or more computing devices located onboard the vehicle 710. For example, the computing device(s) can be located on and/or within the vehicle 710. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 710 (e.g., its computing system, one or more processors, etc.) to perform operations and functions, such as those described herein for determining object motion, controlling vehicle motion, etc.

The vehicle 710 can include a communications system 725 configured to allow the vehicle computing system 705 (and its computing device(s)) to communicate with other computing devices. The vehicle computing system 705 can use the communications system 725 to communicate with the operations computing system 715 and/or one or more other computing device(s) over one or more networks (e.g., via one or more wireless signal connections). In some implementations, the communications system 725 can allow communication among one or more of the system(s) on-board the vehicle 710. The communications system 725 can include any suitable components for interfacing with one or more network(s), including, for example, transmitters, receivers, ports, controllers, antennas, and/or other suitable components that can help facilitate communication.

As shown in FIG. 7, the vehicle 710 can include one or more vehicle sensors 730, an autonomy computing system 735, one or more vehicle control systems 740, and other systems, as described herein. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel.

The vehicle sensor(s) 730 can be configured to acquire sensor data 745. This can include sensor data associated with the surrounding environment of the vehicle 710. For instance, the sensor data 745 can acquire image and/or other data within a field of view of one or more of the vehicle sensor(s) 730. The vehicle sensor(s) 730 can include a Light Detection and Ranging (LIDAR) system, a Radio Detection and Ranging (RADAR) system, one or more cameras (e.g., visible spectrum cameras, infrared cameras, etc.), motion sensors, and/or other types of imaging capture devices and/or sensors. The sensor data 745 can include image data, radar data, LIDAR data, and/or other data acquired by the vehicle sensor(s) 730. The sensor data 115 can be or otherwise include the sensor data 745 (e.g., acquired by the vehicle 710 via the sensor(s) 730, etc.). The vehicle 710 can also include other sensors configured to acquire data associated with the vehicle 710. For example, the vehicle 710 can include inertial measurement unit(s), wheel odometry devices, and/or other sensors that can acquire data indicative of a past, present, and/or future state of the vehicle 710.

In some implementations, the sensor data 745 can be indicative of one or more objects within the surrounding environment of the vehicle 710. The object(s) can include, for example, vehicles, pedestrians, bicycles, and/or other objects. The object(s) can be located in front of, to the rear of, to the side of the vehicle 710, etc. The sensor data 745 can be indicative of locations associated with the object(s) within the surrounding environment of the vehicle 710 at one or more times. The vehicle sensor(s) 730 can provide the sensor data 745 to the autonomy computing system 735.

In addition to the sensor data 745, the autonomy computing system 735 can retrieve or otherwise obtain map data 750. The map data 750 can provide information about the surrounding environment of the vehicle 710. In some implementations, the vehicle 710 can obtain detailed map data that provides information regarding: the identity and location of different roadways, road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); the location of obstructions (e.g., roadwork, accidents, etc.); data indicative of events (e.g., scheduled concerts, parades, etc.); and/or any other map data that provides information that assists the vehicle 710 in comprehending and perceiving its surrounding environment and its relationship thereto. In some implementations, the map data 750 can include sparse geographic data that includes, for example, only indicia of the boundaries of the geographic area. In some implementations, the vehicle computing system 705 can determine a vehicle route for the vehicle 710 based at least in part on the map data 750.

The vehicle 710 can include a positioning system 755. The positioning system 755 can determine a current position of the vehicle 710. The positioning system 755 can be any device or circuitry for analyzing the position of the vehicle 710. For example, the positioning system 755 can determine position by using one or more of inertial sensors (e.g., inertial measurement unit(s), etc.), a satellite positioning system, based on IP address, by using triangulation and/or proximity to network access points or other network components (e.g., cellular towers, WiFi access points, etc.) and/or other suitable techniques. The position of the vehicle 710 can be used by various systems of the vehicle computing system 705 and/or provided to a remote computing device (e.g., of the operations computing system 715). For example, the map data 750 can provide the vehicle 710 relative positions of the surrounding environment of the vehicle 710. The vehicle 710 can identify its position within the surrounding environment (e.g., across six axes) based at least in part on the data described herein. For example, the vehicle 710 can process the vehicle sensor data 745 (e.g., LIDAR data, camera data) to match it to a map of the surrounding environment to get an understanding of the vehicle's position within that environment.

The autonomy computing system 735 can include a perception system 760, a prediction system 765, a motion planning system 770, and/or other systems that cooperate to perceive the surrounding environment of the vehicle 710 and determine a motion plan for controlling the motion of the vehicle 710 accordingly. For example, the autonomy computing system 735 can obtain the sensor data 745 from the vehicle sensor(s) 730, process the sensor data 745 (and/or other data) to perceive its surrounding environment, predict the motion of objects within the surrounding environment, and generate an appropriate motion plan through such surrounding environment. The autonomy computing system 735 can control the one or more vehicle control systems 740 to operate the vehicle 710 according to the motion plan.

The vehicle computing system 705 (e.g., the autonomy system 735) can identify one or more objects that are proximate to the vehicle 710 based at least in part on the sensor data 745 and/or the map data 750. For example, the vehicle computing system 705 (e.g., the perception system 760) can process the sensor data 745, the map data 750, etc. to obtain perception data 775. The vehicle computing system 705 can generate perception data 775 that is indicative of one or more states (e.g., current and/or past state(s)) of a plurality of objects that are within a surrounding environment of the vehicle 710. For example, the perception data 775 for each object can describe (e.g., for a given time, time period) an estimate of the object's: current and/or past location (also referred to as position); current and/or past speed/velocity; current and/or past acceleration; current and/or past heading; current and/or past orientation; size/footprint (e.g., as represented by a bounding shape); class (e.g., pedestrian class vs. vehicle class vs. bicycle class), the uncertainties associated therewith, and/or other state information. The perception system 760 can provide the perception data 775 to the prediction system 765 (and/or the motion planning system 770).

The prediction system 765 can be configured to predict a motion of the object(s) within the surrounding environment of the vehicle 710. For instance, the prediction system 765 can generate prediction data 780 associated with such object(s). The prediction data 780 can be indicative of one or more predicted future locations of each respective object. For example, the prediction system 780 can determine a predicted motion trajectory along which a respective object is predicted to travel over time. A predicted motion trajectory can be indicative of a path that the object is predicted to traverse and an associated timing with which the object is predicted to travel along the path. The predicted path can include and/or be made up of a plurality of way points. In some implementations, the prediction data 780 can be indicative of the speed and/or acceleration at which the respective object is predicted to travel along its associated predicted motion trajectory. The predictions system 765 can output the prediction data 780 (e.g., indicative of one or more of the predicted motion trajectories) to the motion planning system 770.

The vehicle computing system 705 (e.g., the motion planning system 770) can determine a motion plan 785 for the vehicle 710 based at least in part on the perception data 775, the prediction data 780, and/or other data. A motion plan 785 can include vehicle actions (e.g., planned vehicle trajectories, speed(s), acceleration(s), other actions, etc.) with respect to one or more of the objects within the surrounding environment of the vehicle 710 as well as the objects' predicted movements. For instance, the motion planning system 770 can implement an optimization algorithm, model, etc. that considers cost data associated with a vehicle action as well as other objective functions (e.g., cost functions based on speed limits, traffic lights, etc.), if any, to determine optimized variables that make up the motion plan 785. The motion planning system 770 can determine that the vehicle 710 can perform a certain action (e.g., pass an object) without increasing the potential risk to the vehicle 710 and/or violating any traffic laws (e.g., speed limits, lane boundaries, signage, etc.). For instance, the motion planning system 770 can evaluate one or more of the predicted motion trajectories of one or more objects during its cost data analysis as it determines an optimized vehicle trajectory through the surrounding environment. The motion planning system 785 can generate cost data associated with such trajectories. In some implementations, one or more of the predicted motion trajectories may not ultimately change the motion of the vehicle 710 (e.g., due to an overriding factor such as a jaywalking pedestrian). In some implementations, the motion plan 785 may define the vehicle's motion such that the vehicle 710 avoids the object(s), reduces speed to give more leeway to one or more of the object(s), proceeds cautiously, performs a stopping action, etc.

The motion planning system 770 can be configured to continuously update the vehicle's motion plan 785 and a corresponding planned vehicle motion trajectory. For example, in some implementations, the motion planning system 770 can generate new motion plan(s) 785 for the vehicle 710 (e.g., multiple times per second). Each new motion plan can describe a motion of the vehicle 710 over the next planning period (e.g., next several seconds). Moreover, a new motion plan may include a new planned vehicle motion trajectory. Thus, in some implementations, the motion planning system 770 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 710.

The vehicle computing system 705 can cause the vehicle 710 to initiate a motion control in accordance with at least a portion of the motion plan 785. For instance, the motion plan 785 can be provided to the vehicle control system(s) 740 of the vehicle 710. The vehicle control system(s) 740 can be associated with a vehicle controller (e.g., including a vehicle interface) that is configured to implement the motion plan 785. The vehicle controller can, for example, translate the motion plan into instructions for the appropriate vehicle control component (e.g., acceleration control, brake control, steering control, etc.). By way of example, the vehicle controller can translate a determined motion plan 785 into instructions to adjust the steering of the vehicle 710 "X" degrees, apply a certain magnitude of braking force, etc. The vehicle controller (e.g., the vehicle interface) can help facilitate the responsible vehicle control (e.g., braking control system, steering control system, acceleration control system, etc.) to execute the instructions and implement the motion plan 785 (e.g., by sending control signal(s), making the translated plan available, etc.). This can allow the vehicle 710 to autonomously travel within the vehicle's surrounding environment.

The computing system 100 can be configured to initiate one or more vehicle actions based at least in part on the output 130. For instance, the computing system 100 can be located onboard the vehicle 710 as a portion of the vehicle computing system 705. The computing system 100 (e.g., the vehicle computing system 705) can initiate the performance of one or more vehicle actions by the vehicle 710 based at least in part on the classification for each point (of at least the portion of) the plurality of points within the three-dimensional data. The vehicle action(s) can be associated with the autonomous operation of the vehicle 710. For example, the vehicle computing system 705 (e.g., an onboard perception system 775) can utilize the per-point classifications to detect and track one or more objects that are within the surrounding environment of the vehicle 710. Moreover, the vehicle computing system 705 can plan the motion of the vehicle 710 based at least in part on these classifications. By way of example, the objects detected (and/or tracked) based at least in part on the per-point classifications can be considered when formulating a motion plan 785 and/or one or more vehicle trajectories (e.g., during the cost data analysis of the motion planning system 770). Additionally, or alternatively, the vehicle computing system 705 can utilized the classification for each point (e.g., identify roads, etc.) to help localize itself within the vehicle's surrounding environment. For implementations in which the computing system 100 is not located onboard the vehicle 710, the output 130 can be provided to the vehicle 710 (e.g., via one or more wireless networks) to initiate a vehicle action (e.g., to allow the vehicle computing system 705 to consider the output 130).

The computing system 100 can be configured to initiate one or more actions, that are not associated with a vehicle, based at least in part on the output 130. For example, in the event that the environment is an indoor environment 200B, the computing system 100 can detect one or more objects (e.g., structural objects, moveable objects, etc.) within the indoor environment 200B. Additionally, or alternatively, the computing system 100 can determine whether the indoor environment 200B has changed based at least in part on the classifications of the points (e.g., determining whether the overall scene and/or any of the objects within have changed from one time to another, etc.).

Figure 8:
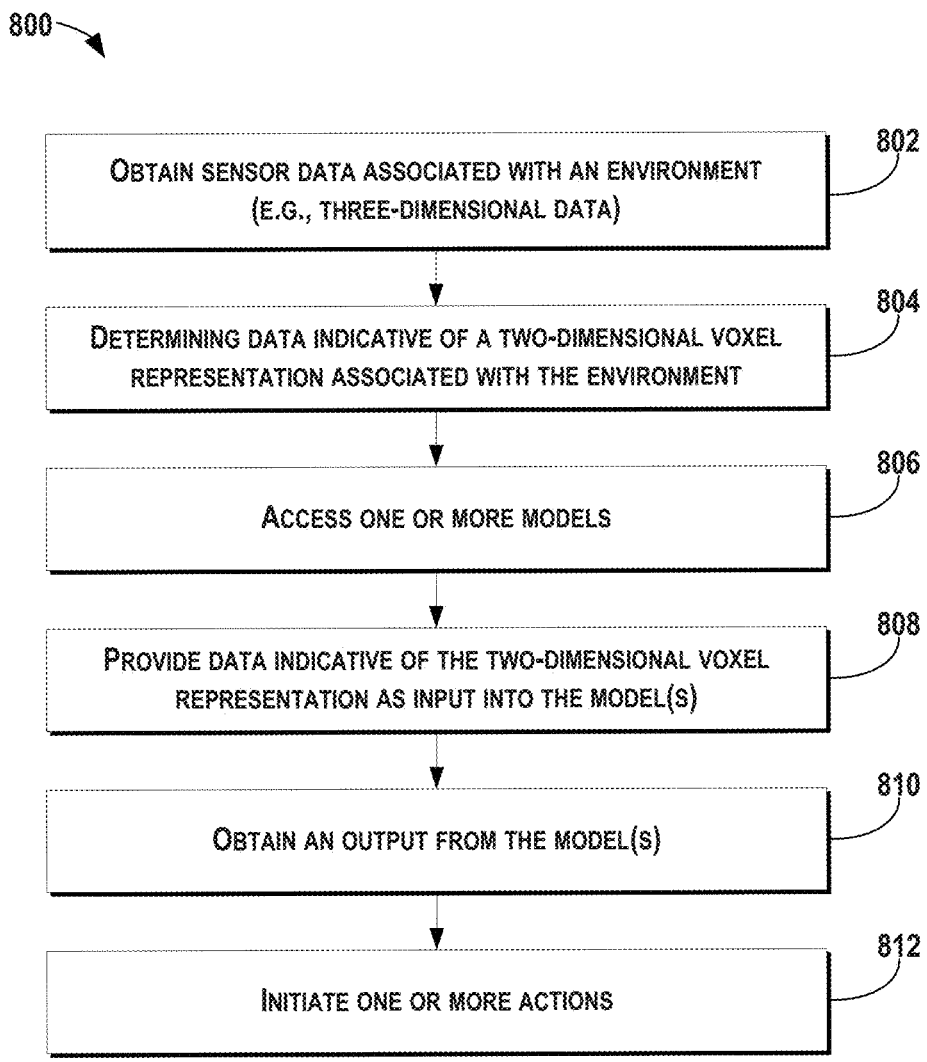
FIG. 8 depicts a flow diagram of example method for semantic segmentation according to example embodiments of the present disclosure.

FIG. 8 depicts a flow diagram of an example method 800 of performing semantic segmentation of an environment represented by three-dimensional data according to example embodiments of the present disclosure. One or more portion(s) of the method 800 can be implemented by a computing system that includes one or more computing devices such as, for example, the computing systems described with reference to FIGS. 1, 7, and/or 9. Each respective portion of the method 800 can be performed by any (or any combination) of one or more computing devices. Moreover, one or more portion(s) of the method 800 can be implemented as an algorithm on the hardware components of the device(s) described herein (e.g., as in FIGS. 1, 7, and 9), for example, to semantically label various segments of an environment. FIG. 8 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 8 is described with reference to other systems and figures for example illustrated purposes and is not meant to be limiting. One or more portions of method 800 can be performed additionally, or alternatively, by other systems.

At (802), the method 800 can include obtaining sensor data associated with an environment. For instance, the computing system 100 can obtain sensor data 115 comprising three-dimensional data associated with an environment 200A-B. The sensor data 115 can be acquired via one or more types of sensors. For example, the sensor data 115 can be acquired via a LIDAR system, camera(s), motion sensors, and/or other types of sensors. As described herein, the three-dimensional data can include a plurality of points. The plurality of points can be included within a three-dimensional point cloud associated with the environment 200A-B. The environment can be an outdoor environment 200A and/or an indoor environment 200B.

At (804), the method 800 can include determining data indicative of a two-dimensional voxel representation associated with the environment. The computing system 100 can determine data indicative of a two-dimensional voxel representation 120 (e.g., voxel representation 420) associated with the environment 200A-B based at least in part on the three-dimensional data. For example, the computing system 100 can generate a voxel grid 410 (including one or more voxels 415) based at least in part on the three-dimensional data. The voxel grid 410 can be represented by two horizontal axes (e.g., x-axis, y-axis, etc.) and a vertical axis (e.g., z-axis, gravitational axis, etc.). The computing system 100 can generate the two-dimensional voxel representation 120 based at least in part on the voxel grid 410. The two-dimensional voxel representation 120 can be associated with one or more voxels 415 (e.g., of the voxel grid 410). The two-dimensional voxel representation 120 can be associated with one or more channels. The one or more channels can include a feature channel indicative of the vertical axis. The one or more channels can include a channel indicative of whether one or more points are located within the associated voxel (e.g., an occupancy channel, etc.). In some implementations, the one or more channels can be encoded with one or more sensor modalities (e.g., RGB, intensity, etc.) associated with the sensor data 115.

In some implementations, the three-dimensional data can be associated with a plurality of time stamps. The two-dimensional voxel representation 120 can be associated one or more channels, each channel corresponding to a time stamp of the plurality of time stamps.

At (806), the method 800 can include accessing one or more models. For instance, the computing system 100 can access one or more models 125 (e.g., the machine-learned semantic segmentation model) from a local memory, remote memory, another system, etc. The computing system 100 can provide, as an input, data indicative of the two-dimensional voxel representation 120 associated with the environment 200A-B into the model(s) 125 (e.g., the machine-learned semantic segmentation model), at (808). As described herein, the model(s) 125 can be trained to predict a voxel classification for each voxel 415 associated with the two-dimensional voxel representation 120. Moreover, the model(s) 125 can be trained to project the voxel classification for each voxel 415 into the three-dimensional data to determine the classification for each point of the plurality of points within the three-dimensional data.

For instance, the computing system 100 can determine a voxel classification for each voxel based at least in part on the model(s) 125. The model(s) 125 (e.g., the machine-learned semantic segmentation model) can process the two-dimensional voxel representation 120 to determine voxel classifications for each voxel 415. For instance, the model(s) 125 (e.g., the machine-learned semantic segmentation model) can determine a probability distribution across a plurality of classes for each voxel 415. The model(s) 125 (e.g., the machine-learned semantic segmentation model) can predict a voxel classification for each voxel 415 based at least in part on the associated probability distribution. For example, a softmax can be applied to determine a voxel classification for each voxel 415.

The computing system 100 can determine the classification for each point based at least in part on the model(s) 125. The model(s) 125 (e.g., the machine-learned semantic segmentation model) can be trained to determine a classification for the point(s) within the three-dimensional data based at least in part on the voxel classification(s). For instance, the model(s) 125 (e.g., the machine-learned semantic segmentation model) can project the voxel classification for each voxel 415 into the three-dimensional data set to determine a classification for each point of the plurality of points within the three-dimensional data. By way of example, the model(s) 125 (e.g., the machine-learned semantic segmentation model) can bi-linearly interpolate the per-voxel predictions in a downscaled voxel grid back to its original size. The model(s) 125 (e.g., the machine-learned semantic segmentation model) can utilize an interpolation method (e.g., nearest neighbor, etc.) to obtain per-point predictions for the points of a particular voxel. The model(s) 125 (e.g., the machine-learned semantic segmentation model) can be trained to take into account its calculated uncertainty (e.g., via an aggregate function, etc.) when formulating its classification predictions.

At (810), the method 800 can include obtaining an output from the model(s). For instance, the computing system 100 can obtain an output 130 from the model(s) 125 (e.g., the machine-learned semantic segmentation model). As described herein, the output 130 can be indicative of a classification for each point of (at least a portion of) the plurality of points of the three-dimensional data (e.g., a LIDAR point cloud, etc.). In some implementations, the output 130 can be indicative of the classification for each point of (at least a portion of) the plurality of points of the three-dimensional data at each of a plurality of time stamps (e.g., associated with a travel sequence of a vehicle).

At (812), the method 800 can include initiating one or more actions. For instance, the computing system 100 can be located onboard a vehicle 710 (e.g., an autonomous vehicle) and/or otherwise communicate with the vehicle's computing system. The computing system 100 can initiating a performance of one or more vehicle actions by the vehicle 710 based at least in part on the classification for each point of the plurality of points within the three-dimensional data. As described herein, the vehicle action(s) can include object detection, object tracking, predicting the motion of one or more object(s), planning the motion of the vehicle, etc. In another example, the computing system 100 can initiate the performance of one or more actions associated with an indoor environment. Such actions can include, for example, detecting one or more objects within the indoor environment, determining whether the environment (and/or the objects therein) has experienced a change (e.g., been move, adjusted, removed, added, degenerated, etc.).

Figure 9:
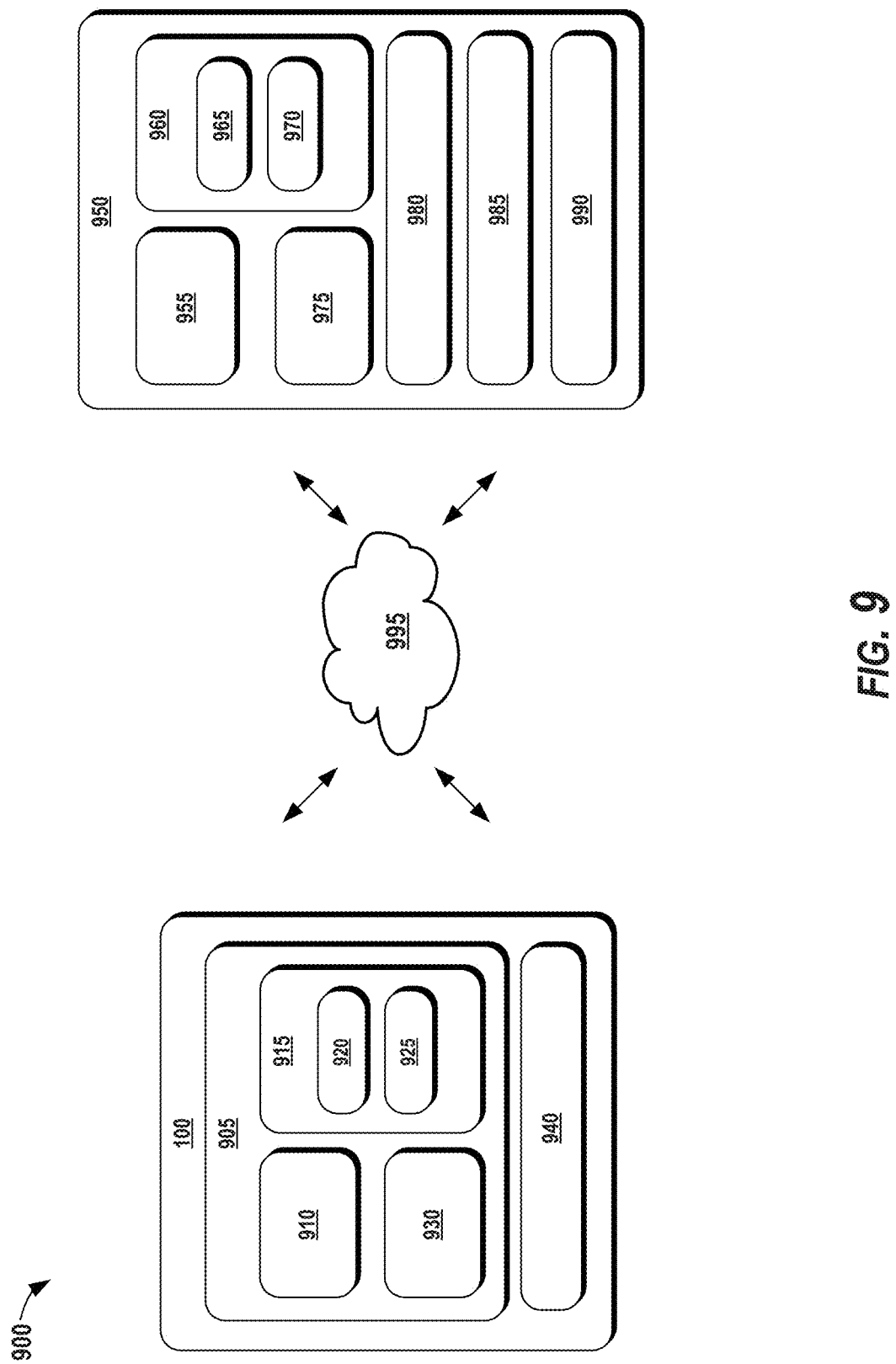
FIG. 9 depicts example system components according to example embodiments of the present disclosure.

FIG. 9 depicts example system components of an example system 900 according to example embodiments of the present disclosure. The example system 900 can include the computing system 100 and a machine learning computing system 950 that are communicatively coupled over one or more network(s) 995. As described herein, the computing system 100 can be implemented onboard a vehicle (e.g., as a portion of the vehicle computing system 705) and/or can be remote from a vehicle (e.g., as portion of an operations computing system 715). In either case, a vehicle computing system 105 can utilize the operations and model(s) of the computing system 100 (e.g., locally, via wireless network communication, etc.).

The computing system 100 can include one or more computing device(s) 905. The computing device(s) 905 of the computing system 100 can include processor(s) 910 and a memory 915. The one or more processors 910 can be any suitable processing device (e.g., a processor core, a microprocessor, an ASIC, a FPGA, a controller, a microcontroller, etc.) and can be one processor or a plurality of processors that are operatively connected. The memory 915 can include one or more non-transitory computer-readable storage media, such as RAM, ROM, EEPROM, EPROM, one or more memory devices, flash memory devices, etc., and/or combinations thereof.

The memory 915 can store information that can be obtained by the one or more processors 910. For instance, the memory 915 (e.g., one or more non-transitory computer-readable storage mediums, memory devices, etc.) can include computer-readable instructions 920 that can be executed by the one or more processors 910. The instructions 920 can be software written in any suitable programming language or can be implemented in hardware. Additionally, or alternatively, the instructions 920 can be executed in logically and/or virtually separate threads on processor(s) 910.

For example, the memory 915 can store instructions 920 that when executed by the one or more processors 910 cause the one or more processors 910 (the computing system 100) to perform operations such as any of the operations and functions of the computing system 100 and/or for which the computing system 100 is configured, as described herein, the operations for performing semantic segmentation of an environment (e.g., one or more portions of method 800), the operations and functions for initiating actions, the operations and functions of any of the models described herein and/or for which the models are configured and/or any other operations and functions for the computing system 100, as described herein.

The memory 915 can store data 925 that can be obtained (e.g., received, accessed, written, manipulated, generated, created, stored, etc.). The data 925 can include, for instance, sensor data, input data, data indicative of two-dimensional voxel representations, data indicative of model(s), output data, per-voxel classifications, per-point classifications, data associated with action(s), and/or other data/information described herein. In some implementations, the computing device(s) 905 can obtain data from one or more memories that are remote from the computing system 100.

The computing device(s) 905 can also include a communication interface 930 used to communicate with one or more other system(s) (e.g., other systems onboard and/or remote from a vehicle, the other systems of FIG. 9, etc.). The communication interface 930 can include any circuits, components, software, etc. for communicating via one or more networks (e.g., 980). In some implementations, the communication interface 930 can include, for example, one or more of a communications controller, receiver, transceiver, transmitter, port, conductors, software and/or hardware for communicating data/information.

According to an aspect of the present disclosure, the computing system 100 can store or include one or more models 940. As examples, the model(s) 940 can be or can otherwise include various machine-learned model(s) such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks (e.g., convolutional neural networks, etc.), recurrent neural networks (e.g., long short-term memory recurrent neural networks, etc.), and/or other forms of neural networks. The machine-learned models 940 can include the model(s) 125, the model architectures 500A-B, and/or other model(s)/model architecture(s), as described herein.

In some implementations, the computing system 100 can receive the one or more machine-learned models 940 from the machine learning computing system 950 over the network(s) 995 and can store the one or more machine-learned models 940 in the memory 915 of the computing system 100. The computing system 100 can use or otherwise implement the one or more machine-learned models 940 (e.g., by processor(s) 910). In particular, the computing system 100 can implement the machine learned model(s) 940 to perform a semantic segmentation of an environment, as described herein.

The machine learning computing system 950 can include one or more processors 955 and a memory 960. The one or more processors 955 can be any suitable processing device (e.g., a processor core, a microprocessor, an ASIC, a FPGA, a controller, a microcontroller, etc.) and can be one processor or a plurality of processors that are operatively connected. The memory 960 can include one or more non-transitory computer-readable storage media, such as RAM, ROM, EEPROM, EPROM, one or more memory devices, flash memory devices, etc., and/or combinations thereof.

The memory 960 can store information that can be accessed by the one or more processors 955. For instance, the memory 960 (e.g., one or more non-transitory computer-readable storage mediums, memory devices, etc.) can store data 965 that can be obtained (e.g., generated, retrieved, received, accessed, written, manipulated, created, stored, etc.). In some implementations, the machine learning computing system 950 can obtain data from one or more memories that are remote from the machine learning computing system 950.

The memory 960 can also store computer-readable instructions 970 that can be executed by the one or more processors 955. The instructions 970 can be software written in any suitable programming language or can be implemented in hardware. Additionally, or alternatively, the instructions 970 can be executed in logically and/or virtually separate threads on processor(s) 955. The memory 960 can store the instructions 970 that when executed by the one or more processors 955 cause the one or more processors 955 to perform operations. The machine learning computing system 950 can include a communication system 975, including devices and/or functions similar to that described with respect to the computing system 100.

In some implementations, the machine learning computing system 950 can include one or more server computing devices. If the machine learning computing system 950 includes multiple server computing devices, such server computing devices can operate according to various computing architectures, including, for example, sequential computing architectures, parallel computing architectures, or some combination thereof.

In addition or alternatively to the model(s) 940 at the computing system 100, the machine learning computing system 950 can include one or more models 980. As examples, the model(s) 980 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks (e.g., convolutional neural networks), recurrent neural networks (e.g., long short-term memory recurrent neural networks, etc.), and/or other forms of neural networks. The model(s) 980 can be similar to and/or the same as the models 940, 125.

As an example, the machine learning computing system 950 can communicate with the computing system 100 according to a client-server relationship. For example, the machine learning computing system 950 can implement the model(s) 980 to provide a web service to the computing system 100 (e.g., including on a vehicle, implemented as a system remote from the vehicle, etc.). For example, the web service can provide models (e.g., machine-learned models) to an entity associated with a vehicle; such that the entity can implement the models (e.g., to preform semantic segmentation, etc.). Thus, model(s) 980 can be located and used at the computing system 100 (e.g., on the vehicle, at the operations computing system, etc.) and/or the machine-learned models 980 can be located and used at the machine learning computing system 950.

In some implementations, the machine learning computing system 950 and/or the computing system 100 can train the machine-learned models 940 and/or 980 through use of a model trainer 985. The machine-learned machine learning computing system 950 (e.g., the model trainer 985) can be configured to perform operations to train a model according to the techniques described herein. For instance, the machine-learned machine learning computing system 950 can obtain data indicative of a model 980 (e.g., a neural network). The machine-learned machine learning computing system 950 can train the model 980 to predict a classification for each point of a plurality of points of a three-dimensional dataset associated with an environment based on a two-dimensional voxel representation of the three-dimensional dataset, as described herein.

The model trainer 985 can train the machine-learned models 940 and/or 980 using one or more training or learning algorithms. One example training technique is backwards propagation of errors. In some implementations, the model trainer 985 can perform supervised training techniques using a set of labeled training data (e.g., with labelled classifications, etc.). In other implementations, the model trainer 985 can perform unsupervised training techniques using a set of unlabeled training data. The model trainer 985 can perform a number of generalization techniques to improve the generalization capability of the models being trained. Generalization techniques include weight decays, dropouts, or other techniques.

The models(s) 940/980 can be trained using training data 990. The training data 990 can be associated with a variety of environments. This can help show that the two-dimensional voxel representation approach of the present disclosure is generalizable and applicable to a variety of problems. For example, the training data 990 can include a dataset that includes three-dimensional scans of a plurality of indoor areas in a plurality of structures. This can include a plurality of rooms (e.g., 270 rooms and over 6000 m$^2$). Each point in the dataset can include sensor modality information (e.g., RGB, etc.) and global positioning information (e.g., XYZ information, etc.). Each point can be annotated with a semantic label from a plurality of classes. The classes can include, for example, structural classes, moveable classes, a clutter class (e.g., for other elements), and/or other classes.

For such training data (e.g., indoor training data) the individual areas (e.g., rooms, etc.) can be divided into blocks represented by two horizontal axes (e.g., x, y blocks), while keeping the entire vertical axis (e.g., z-axis) to allow for the floor and ceiling to be present in every block. In some implementations, areas (e.g., rooms) that are larger than a threshold (e.g., larger than 16 m×16 m) can be represented with multiple, overlapping blocks. Each block can be divided into a voxel grid in a manner as similarly described herein.

In some implementations, model development can be performed in separate stages. For example, one stage of training can include a model that only uses voxel occupancy, discarding sensor modality information (e.g., RGB information). For example, a voxel grid (e.g., 16 m×16 m×5 m) can be divided into 320×320×50 voxel cells with dimensions 5 cm×5 cm×10 cm. A bucket bin (e.g., above 5 m) can be utilized to include any remaining points outside the defined voxel grid size. This can result in a three-dimensional tensor (e.g., of size 320×320×51). In some implementations, to supplement the training data 990, data augmentation can be performed. This can include, for example, the use of random rotation about the gravitational axis and scaling. At another stage, the available sensor modality information (e.g., RGB information) can be incorporated. As described herein, this can be represented as one or more additional channels in each voxel cell. To generate a two-dimensional voxel representation, these additional channels can be flattened into the feature dimension, effectively expanding the input feature channel size (e.g., by a factor of 4, etc.).

Additionally or alternatively, the training data 990 can be associated with an outdoor environment. For example, the training data 990 can include a dataset that includes a three-dimensional road scene dataset containing labelled point clouds. The point clouds can be obtained via video snippets acquired using a LIDAR system of a vehicle (e.g., a roof mounted LIDAR system). The per-pointed annotations can be indicative of a plurality of classifications. The classifications can include, for example, vehicle, pedestrian, bicyclist, motorcyclist, animal, road, background, and/or other classes. The dataset can be composed of a plurality of snippets, where each snippet includes a plurality of frames (e.g., 250 frames, etc.) and each frames includes a plurality of points (e.g., 100,000 points, etc.). The dataset can be randomly partitioned on a snippet level to obtain separate train and test snippets. The training can be performed based at least in part on a plurality of randomly selected snippets. The model(s) 940/980 can be trained using a weight cross entropy loss as described herein. Moreover, to account for potential class imbalances in the training data 990, the gradients can be clipped to a certain magnitude (e.g., to a magnitude of 1, etc.). The model(s) 940/980 can be trained on a region of interest (e.g., of size 64 m×64 m×4 m), with a vehicle in the center (e.g., 32 m in front/behind the vehicle, 32 m to the left/right of the vehicle, and 4 m above the ground, etc.).

In some implementations, the model(s) 940/980 can be trained to address the possibility of class imbalanced datasets. For example, the model(s) can be trained using a class-balanced weighted cross-entropy loss similar defined as:

$$H(y, x) = -\sum_i \alpha_i p(y_i) \log(p(x_i))$$

$$\alpha_i = \text{median\_freq}/f_i$$

where ($f_i$) is the number of points of class (i) in the training set divided by the total number of points in the training set, and (median freq) is the median of frequencies ($f_i$). As described herein, the model(s) can be trained with a loss defined on a per-voxel metric rather than a per-point metric. During training, all unoccupied voxels can be treated as a "don't care" class, with $\alpha=0$.

The training data 990 can include, for example, a dense benchmark dataset associated with an indoor environment. The model(s) can be trained using an optimizer with a learning rate (e.g., 0.0001), a weight decay (e.g., 0.0005), and betas (e.g., 0.9. 0.999) that can be set. While the model(s) 940/990 can be trained on a per-voxel basis, the metrics for evaluating the model(s) can be per-point metrics. Mean class accuracy (mAcc) and mean class IOU (mIOU) can be used for such metric. For example, mean class accuracy can be expressed as:

$$mAcc = \frac{1}{K}\sum_i^K \frac{tp_i}{tp_i + fn_i}$$

where (K) is the number of classes, ($t_p$) is the number of true positives, and ($f_n$) is the number of false negatives. Mean class IOU (mIOU), for example, can be expressed as:

$$mIOU = \frac{1}{K}\sum_i^K \frac{tp_i}{tp_i + fn_i + fp_i}$$

where (K) is the number of classes, ($t_p$) is the number of true positives, ($f_n$) is the number of false negatives and ($f_p$) is the number of false positives.

In some implementations, the training data 990 can be taken from the same vehicle as that which utilizes that model 940/980. Accordingly, the models 940/980 can be trained to determine outputs in a manner that is tailored to that particular vehicle. Additionally, or alternatively, the training data 990 can be taken from one or more different vehicles than that which is utilizing that model 940/980. The model trainer 9985 can be implemented in hardware, firmware, and/or software controlling one or more processors.

The network(s) 995 can be any type of network or combination of networks that allows for communication between devices. In some embodiments, the network(s) 995 can include one or more of a local area network, wide area network, the Internet, secure network, cellular network, mesh network, peer-to-peer communication link and/or some combination thereof and can include any number of wired or wireless links. Communication over the network(s) 980 can be accomplished, for instance, via a network interface using any type of protocol, protection scheme, encoding, format, packaging, etc.

FIG. 9 illustrates one example system 900 that can be used to implement the present disclosure. Other computing systems can be used as well. For example, in some implementations, the computing system 100 can include the model trainer 985 and/or the training data 990. In such implementations, the machine-learned models 940 can be both trained and used locally at the computing system 100 (e.g., at a vehicle).

Computing tasks discussed herein as being performed at computing device(s) remote from the computing system 100 and/or the vehicle can instead be performed at the computing system 100 and/or the vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of semantic segmentation, the method comprising:
    obtaining, by a computing system comprising one or more computing devices, sensor data comprising three-dimensional data associated with an environment, wherein the three-dimensional data comprises a plurality of points;
    determining, by the computing system, data indicative of a two-dimensional voxel representation associated with the environment based at least in part on the three-dimensional data, wherein determining the data indicative of the two-dimensional voxel representation associated with the environment based at least in part on the three-dimensional data comprises
        generating a voxel grid based at least in part on the three-dimensional data, the voxel d represented by two horizontal axes and a vertical axis,
        generating the two-dimensional voxel representation based at least in part on the voxel grid, wherein the two-dimensional voxel representation is associated with one or more channels;
accessing, by the computing system, a machine-learned semantic segmentation model;
providing as an input, by the computing system, the data indicative of the two-dimensional voxel representation associated with the environment into the machine-learned semantic segmentation model; and
obtaining, by the computing system, an output from the machine-learned semantic segmentation model, wherein the output is indicative of a classification for each point of the plurality of points.

2. The computer-implemented method of claim 1, wherein the one or more channels comprise a feature channel indicative of the vertical axis.

3. The computer-implemented method of claim 1, wherein the one or more channels are encoded with one or more sensor modalities associated with the sensor data.

4. The computer-implemented method of claim 1, wherein the three-dimensional data is associated with a plurality of time stamps, and wherein the two-dimensional voxel representation is associated with one or more channels, each channel corresponding to a time stamp of the plurality of time stamps.

5. The computer-implemented method of claim 4, wherein the output is indicative of the classification for each point of the plurality of points of the three-dimensional data at each of the plurality of time stamps.

6. The computer-implemented method of claim 1, wherein:
the two-dimensional voxel representation is associated with one or more voxels; and
the machine-learned semantic segmentation model is trained to predict a voxel classification for each voxel associated with the two-dimensional voxel representation and to project the voxel classification for each voxel into the three-dimensional data to determine the classification for each point of the plurality of points within the three-dimensional data.

7. The computer-implemented method of claim 1, wherein the plurality of points are included within a three-dimensional point cloud associated with the environment.

8. The computer-implemented method of claim 1, wherein the sensor data is acquired via a LIDAR system.

9. The computer-implemented method of claim 1, wherein the computing system is located onboard an autonomous vehicle.

10. The computer-implemented method of claim 9, wherein the method further comprises:
initiating, by the computing system, a performance of one or more vehicle actions by the autonomous vehicle based at least in part on the classification for each point of the plurality of points.

11. A computing system, comprising:
one or more processors; and
one or more tangible, non-transitory, computer readable media that collectively store instructions that when executed by the one or more processors cause the computing system to perform operations comprising:
obtaining sensor data comprising three-dimensional data associated with an environment, wherein the three-dimensional data comprises a plurality of points, and wherein the sensor data is associated with one or more times;
determining data indicative of a two-dimensional voxel representation associated with the environment based at least in part on the three-dimensional data, wherein determining the data indicative of the two-dimensional voxel representation associated with the environment comprises
generating a voxel grid based at least in part on the three-dimensional data, the voxel grid represented by two horizontal axes and a vertical axis, and
generating the two-dimensional voxel representation based at least in part on the voxel grid, wherein the two-dimensional voxel representation comprises a bird's eye view of the voxel grid and is associated with at least one channel that is indicative of the vertical axis of the voxel grid; and
determining a classification for each point of the plurality of points within the three-dimensional data based at least in part on the two-dimensional voxel representation associated with the environment and a machine-learned semantic segmentation model.

12. The computing system of claim 11, wherein determining the classification for each point of the plurality of points within the three-dimensional data comprises:
accessing the machine-learned semantic segmentation model;
providing, as an input, the data indicative the two-dimensional voxel representation associated with the environment into the machine-learned semantic segmentation model; and
obtaining an output from the machine-learned semantic segmentation model, wherein the output is indicative of the classification for each point of the plurality of points.

13. The computing system of claim 11, wherein the sensor data is acquired via one or more cameras.

14. The computing system of claim 11, wherein the sensor data is acquired via one or more motion sensors.

15. One or more tangible, non-transitory, computer-readable media that collectively store instructions that, when executed by one or more processors, cause the one or more processors to perform operations, the operations comprising:
obtaining sensor data comprising three-dimensional data associated with an environment, wherein the three-dimensional data comprises a plurality of points;
determining data indicative of a two-dimensional voxel representation associated with the environment based at least in part on the three-dimensional data, wherein the two-dimensional voxel representation is associated with one or more voxels, wherein determining the data indicative of the two-dimensional voxel representation associated with the environment based at least in part on the three-dimensional data comprises
generating a voxel grid based at least in part on the three-dimensional data, the voxel grid represented by two horizontal axes and a vertical axis,
generating the two-dimensional voxel representation based at least in part on the voxel grid, wherein the two-dimensional voxel representation is associated with one or more channels;
determining a voxel classification for each voxel associated with the two-dimensional voxel representation based at least in part on the two-dimensional voxel representation; and
determining a classification for each point of the plurality of points within the three-dimensional data based at least in part on the voxel classification for each voxel.

16. The one or more tangible, non-transitory, computer-readable media of claim 15, wherein determining the voxel classification for each voxel of the voxel representation comprises determining the voxel classification for each voxel based at least in part on a model, and wherein determining the classification for each point of the plurality of points within the three-dimensional data comprises determining the classification for each point based at least in part on the model.

17. The one or more tangible, non-transitory, computer-readable media of claim 15, wherein the environment is an outdoor environment.

18. The one or more tangible, non-transitory, computer-readable media of claim 15, wherein the environment is an indoor environment.

19. A computer-implemented method of semantic segmentation, the method comprising:
   obtaining, by a computing system comprising one or more computing devices, sensor data comprising three-dimensional data associated with an environment, wherein the three-dimensional data comprises a plurality of points;
   determining, by the computing system, data indicative of a two-dimensional voxel representation associated with the environment based at least in part on the three-dimensional data, wherein the three-dimensional data is associated with a plurality of time stamps, and wherein the two-dimensional voxel representation is associated one or more channels, each channel corresponding to a time stamp of the plurality of time stamps;
   accessing, by the computing system, a machine-learned semantic segmentation model;
   providing as an input, by the computing system, the data indicative of the two-dimensional voxel representation associated with the environment into the machine-learned semantic segmentation model; and
   obtaining, by the computing system, an output from the machine-learned semantic segmentation model, wherein the output is indicative of a classification for each point of the plurality of points.

20. The computer-implemented method of claim 19, wherein the output is indicative of the classification for each point of the plurality of points of the three-dimensional data at each of the plurality of time stamps.

21. The computer-implemented method of claim 19, wherein:
   the two-dimensional voxel representation is associated with one or more voxels; and
   the machine-learned semantic segmentation model is trained to predict a voxel classification for each voxel associated with the two-dimensional voxel representation and to project the voxel classification for each voxel into the three-dimensional data to determine the classification for each point of the plurality of points within the three-dimensional data.

22. The computer-implemented of claim 19, wherein the computing system is located onboard an autonomous vehicle and wherein the method further comprises:
   initiating, by the computing system, a performance of one or more vehicle actions by the autonomous vehicle based at least in part on the classification for each point of the plurality of points.

23. A computing system, comprising:
   one or more processors; and
   one or more tangible, non-transitory, computer readable media that collectively store instructions that when executed by the one or more processors cause the computing system to perform operations comprising:
   obtaining sensor data comprising three-dimensional data associated with an environment, wherein the three-dimensional data comprises a plurality of points, and wherein the sensor data is associated with one or more times;
   determining data indicative of a two-dimensional voxel representation associated with the environment based at least in part on the three-dimensional data, wherein the three-dimensional data is associated with a plurality of time stamps, and wherein the two-dimensional voxel representation is associated one or more channels, each channel corresponding to a time stamp of the plurality of time stamps; and
   determining a classification for each point of the plurality of points within the three-dimensional data based at least in part on the two-dimensional voxel representation associated with the environment and a machine-learned semantic segmentation model.

24. One or more tangible, non-transitory, computer-readable media that collectively store instructions that, when executed by one or more processors, cause the one or more processors to perform operations, the operations comprising:
   obtaining sensor data comprising three-dimensional data associated with an environment, wherein the three-dimensional data comprises a plurality of points;
   determining data indicative of a two-dimensional voxel representation associated with the environment based at least in part on the three-dimensional data, wherein the two-dimensional voxel representation is associated with one or more voxels, wherein the three-dimensional data is associated with a plurality of time stamps, and wherein the two-dimensional voxel representation is associated one or more channels, each channel corresponding to a time stamp of the plurality of time stamps;
   determining a voxel classification for each voxel associated with the two-dimensional voxel representation based at least in part on the two-dimensional voxel representation; and
   determining a classification for each point of the plurality of points within the three-dimensional data based at least in part on the voxel classification for each voxel.

* * * * *